(12) United States Patent
Kirsch et al.

(10) Patent No.: US 6,908,645 B2
(45) Date of Patent: Jun. 21, 2005

(54) LIQUID-CRYSTALLINE MEDIUM

(75) Inventors: Peer Kirsch, Seeheim-Jugenheim (DE); Marc Lenges, Gross-Umstadt (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/673,477

(22) Filed: Sep. 30, 2003

(65) Prior Publication Data

US 2004/0075081 A1 Apr. 22, 2004

(30) Foreign Application Priority Data

Sep. 30, 2002 (DE) .......................... 102 46 117

(51) Int. Cl.⁷ ........................ C09K 19/30; C09K 19/34; C09K 19/20; C07C 69/76; C07C 25/13; C07D 319/06
(52) U.S. Cl. .............. 428/1.1; 252/299.61; 252/299.63; 252/299.64; 252/299.65; 252/299.66; 252/299.67; 549/369; 560/65; 570/129; 570/144
(58) Field of Search ...................... 428/1.1; 252/299.61, 252/299.63, 299.64, 299.65, 299.66, 299.67; 570/129, 144; 560/65

(56) References Cited

U.S. PATENT DOCUMENTS 5,858,270 A * 1/1999 Matsui et al. .......... 252/299.01

FOREIGN PATENT DOCUMENTS

DE         19949333    *  4/2001

OTHER PUBLICATIONS

English abstract for DE–19949333 by Derwnt, 2001.*

* cited by examiner

Primary Examiner—Shean C. Wu
(74) Attorney, Agent, or Firm—Millen, White, Zelano, Branigan, P.C.

(57) ABSTRACT

The invention relates to liquid-crystalline compounds of the formula I and to a liquid-crystalline medium based on a mixture of polar compounds, characterized in that it comprises one or more compounds of the general formula I

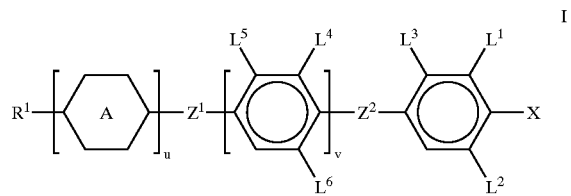

in which $R^1$,

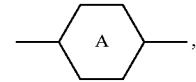

$L^1$, $L^2$, $L^3$, $L^4$, $L^5$, $L^6$, $Z^1$, $Z^2$, X, v and u are as defined in claim 1.

18 Claims, No Drawings

LIQUID-CRYSTALLINE MEDIUM

The present invention relates to liquid-crystalline compounds and a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e., in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapor pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
extended nematic phase range (in particular down to low temperatures)
the ability to switch at extremely low temperatures (outdoor use, automobile, avionics)
increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The present invention thus has an object of providing media, in particular for MLC, TN or STN displays of this type, which do not have the above-mentioned disadvantages or only do so to a reduced extent, and preferably simultaneously have very high specific resistances and low threshold voltages. In particular, it is possible to use the compounds of the formula I for the preparation of low $V_{th}$ mixtures which have a very good $\gamma_1$/clearing point ratio and relatively low Δn values. The mixtures according to the invention are particularly suitable for low Δn applications. The mixtures according to the invention are preferably used in reflective and transflective applications.

Upon further study of the specification and appended claims, further objects and advantages of this invention will become apparent to those skilled in the art.

It has now been found that these and other objects can be achieved if media according to the invention are used in displays.

The present invention thus relates to a liquid-crystalline medium based on a mixture of polar compounds, characterized in that it comprises one or more compounds of the general formula I

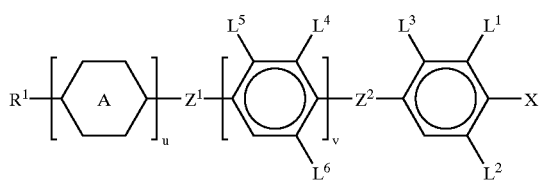

in which
R$^1$ is an alkyl radical having from 1 to 12 carbon atoms which is unsubstituted, monosubstituted by CN or CF$_3$ or monosubstituted to perhalo-substituted by halogen, where one or more CH$_2$ groups in these radicals may also, in each case independently of one another, be replaced by —O—, —S—,

—CH═CH—, —C≡C—, —CO—, —CO—O—, —O—CO— or —O—CO—O— in such a way that O atoms are not linked directly to one another,

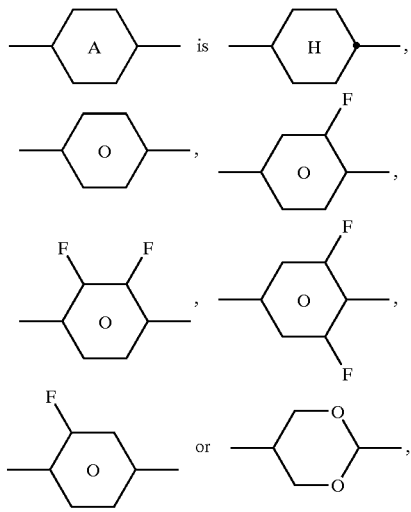

L$^{1-6}$ are each, independently of one another, H or F,
Z$^1$ and Z$^2$ are each, independently of one another, —COO— or —CF$_2$O—, where Z$^1$≠Z$^2$, X is F, Cl, CN, OCN, NCS, SCN, SF$_5$, an unsubstituted alkyl or alkoxy radical, a halogenated alkyl radical, a halogenated alkenyl radical, a halogenated alkoxy radical or a halogenated alkenyloxy radical having up to 6 carbon atoms, and
u is 1 or 2, and
v is 1 or 2.

The invention furthermore relates to the compounds of the formula I. The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimize its threshold voltage and/or its viscosity.

In the pure state, the compounds of the formula I are colorless and form liquid-crystalline mesophases in a temperature range which is favorably located for electro-optical use. They are stable chemically, thermally and to light.

If R$^1$ is an alkyl radical or an alkoxy radical, this may be straight-chain or branched. It is preferably straight-chain, has 2, 3, 4, 5, 6 or 7 carbon atoms and accordingly is preferably methyl, ethyl, propyl, butyl, pentyl, hexyl, heptyl, ethoxy, propoxy, butoxy, pentoxy, hexyloxy or heptyloxy, furthermore octyl, nonyl, decyl, undecyl, dodecyl, methoxy, octyloxy, nonyloxy, decyloxy or undecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R$^1$ is an alkyl radical in which one CH$_2$ group has been replaced by —CH═CH—, this may be straight-chain or branched. It is preferably straight-chain and has from 2 to 10 carbon atoms. Accordingly, it is particularly preferably vinyl, prop-1- or -2-enyl, but-1-, -2- or -3-enyl, pent-1-, -2-, -3- or -4-enyl, hex-1-, -2-, -3-, 4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R$^1$ is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms. Accordingly, they are particularly preferably acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)-ethyl, 3-(methoxycarbonyl)propyl, 3-(ethoxycarbonyl)propyl or 4-(methoxycarbonyl)butyl.

If R$^1$ is an alkyl radical in which one CH$_2$ group has been replaced by unsubstituted or substituted —CH═CH— and an adjacent CH$_2$ group has been replaced by CO or CO—O or O—CO, this may be straight-chain or branched. It is preferably straight-chain and has from 4 to 12 carbon atoms. Accordingly, it is particularly preferably acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ is an alkyl or alkenyl radical which is monosubstituted by CN or $CF_3$, this radical is preferably straight-chain. The substitution by CN or $CF_3$ is possible in any desired position.

If $R^1$ is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds of the formula I which have wing groups $R^1$ which are suitable for polymerization reactions are suitable for the preparation of liquid-crystalline polymers.

Compounds containing branched wing groups $R^1$ may occasionally be of importance owing to better solubility in the conventional liquid-crystalline base materials, but in particular as chiral dopants if they are optically active. Smectic compounds of this type are suitable as components of ferroelectric materials.

Compounds of the formula I having $S_A$ phases are suitable for thermally addressed displays.

Branched groups of this type generally contain not more than one chain branch. Preferred branched radicals $R^1$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^1$ is an alkyl radical in which two or more $CH_2$ groups have been replaced by —O— and/or —CO—O—, this may be straight-chain or branched. It is preferably branched and has from 3 to 12 carbon atoms. Accordingly, it is particularly preferably biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)-butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)-propyl, 4,4-bis(ethoxycarbonyl)butyl or 5,5-bis(ethoxycarbonyl)hexyl.

Particularly preferred compounds of the formula I are selected from the group consisting of compounds of the following sub-formulae I1 to I15:

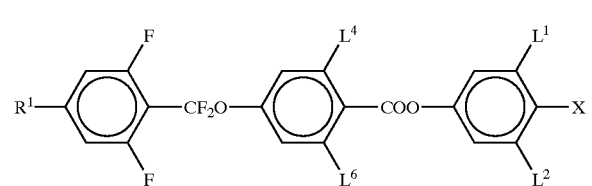

I1

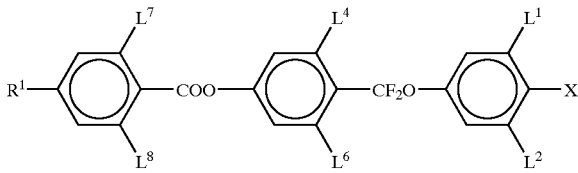

I2

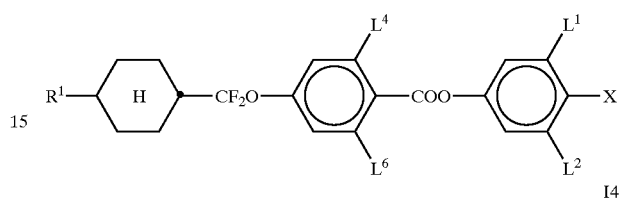

I3

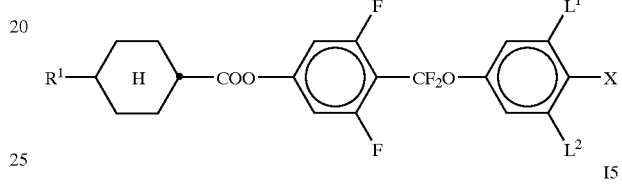

I4

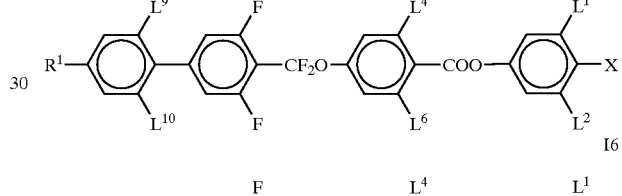

I5

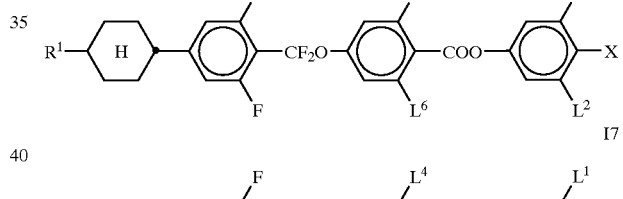

I6

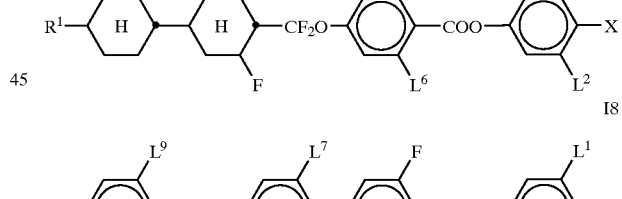

I7

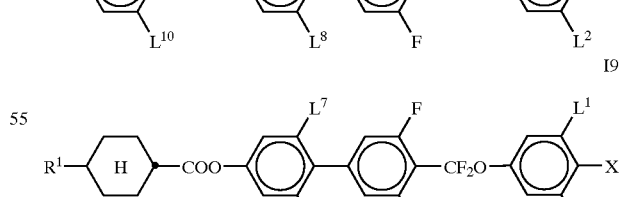

I8

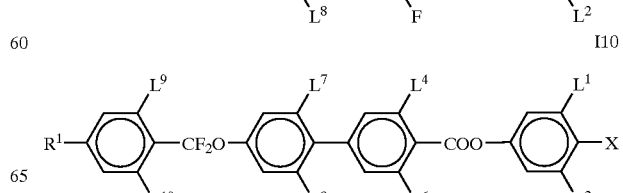

I9

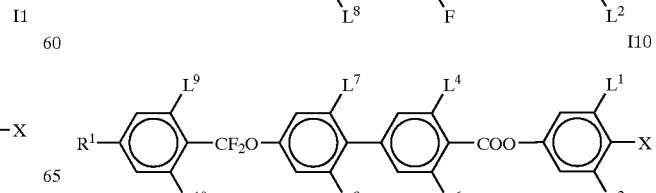

I10

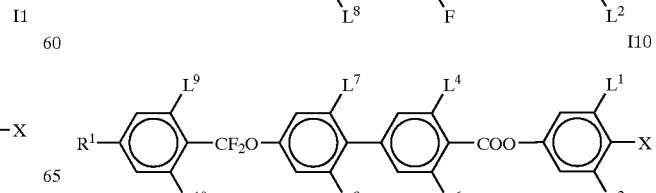

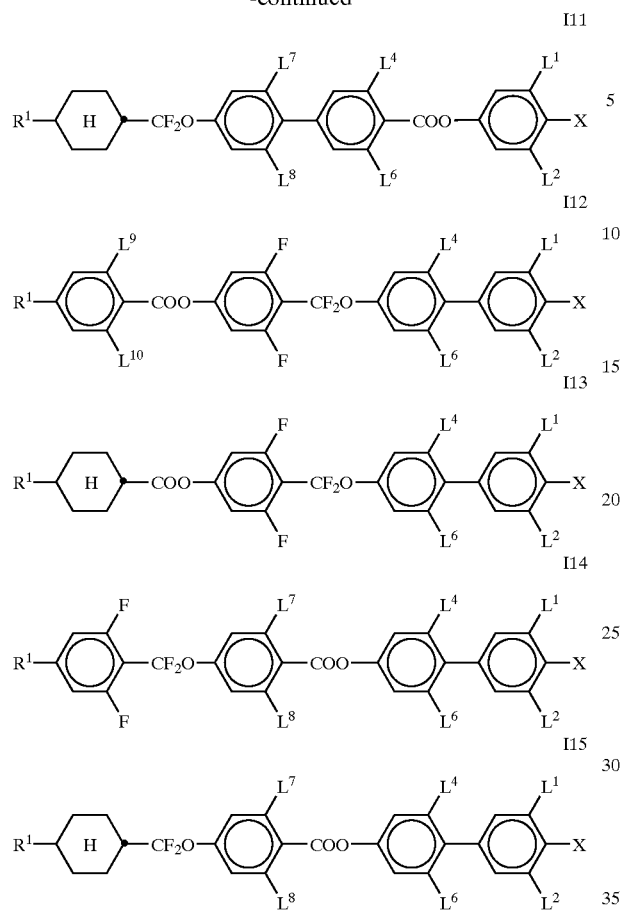

where L[7]–L[10], independently, have one of the meanings given for L[1]–L[6].

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The compounds of the formula I are preferably prepared as follows:

Scheme 1

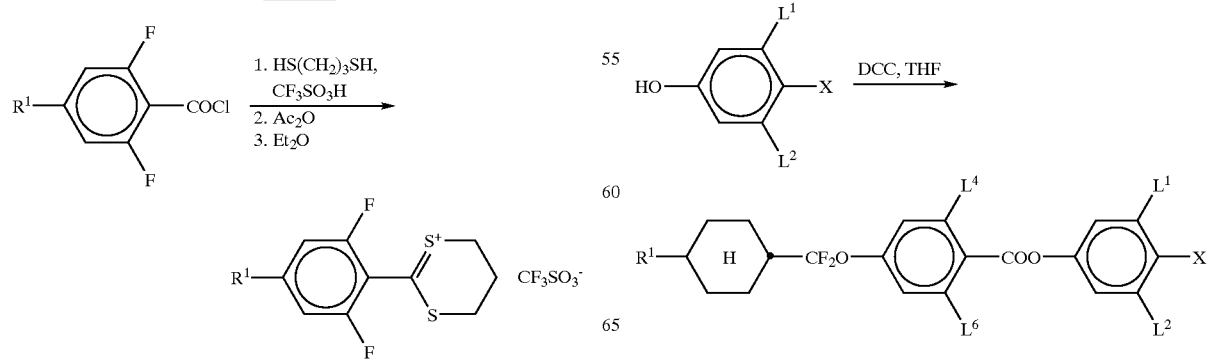

Scheme 2

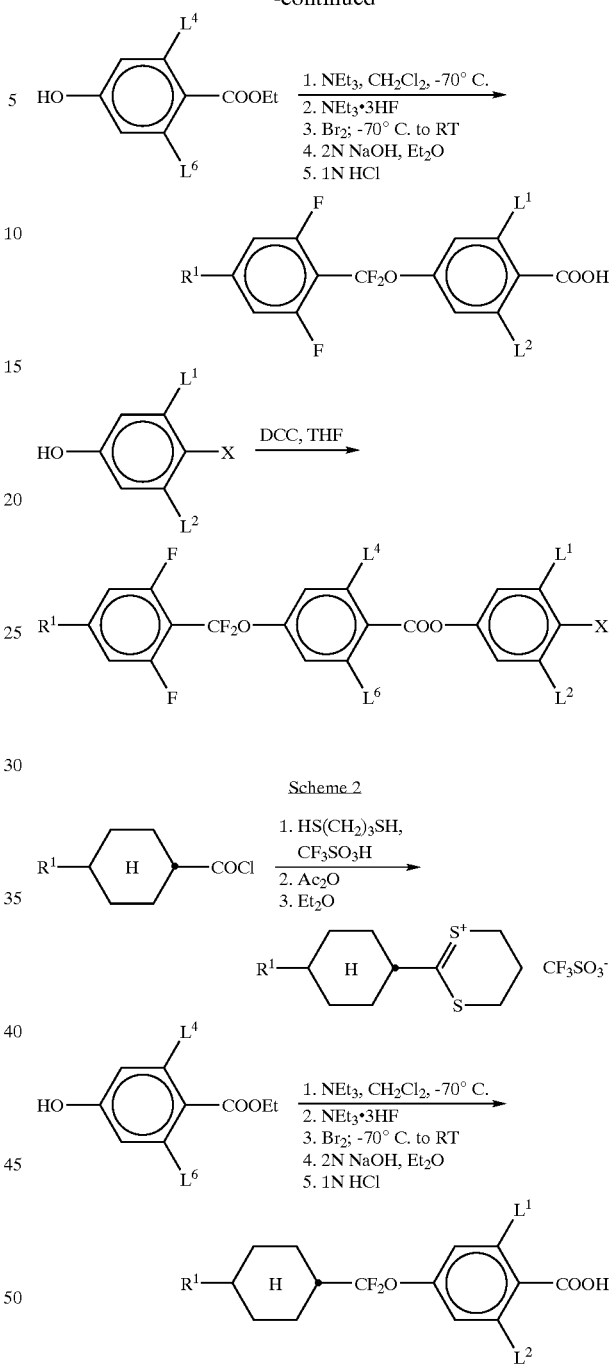

Scheme 3

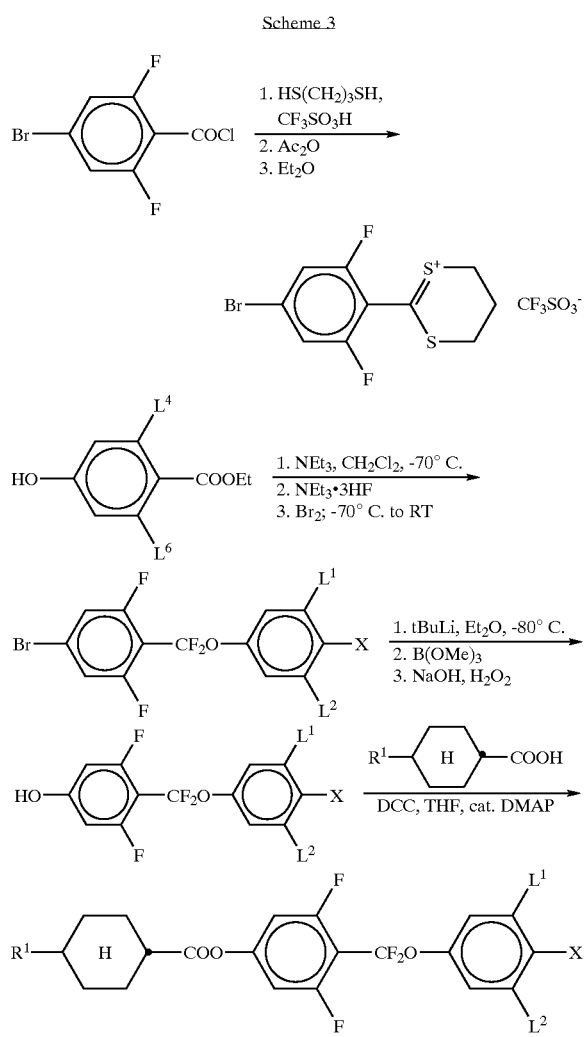

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes. Besides for reflective displays, the mixtures according to the invention are also suitable for IPS (in plane switching) applications, OCB (optically controlled birefringence) applications and VA (vertical alignment) applications.

The liquid-crystal mixtures according to the invention enable a significant widening of the available parameter latitude.

The achievable combinations of clearing point, rotational viscosity, $\gamma_1$, low $\Delta n$ and dielectric anisotropy are far superior to previous materials from the prior art.

The requirement for a high clearing point, a nematic phase at low temperature and a high $\Delta\epsilon$ has hitherto only been achieved to an inadequate extent. Although mixtures such as, for example, MLC-6424 have similar properties to the mixtures according to the invention, they have, however, significantly worse values for the rotational viscosity, $\gamma_1$.

Other mixture systems have comparable flow viscosities $\nu_{20}$ and $\Delta\epsilon$ values, but only have clearing points in the region of 60° C.

The liquid-crystal mixtures according to the invention, while retaining the nematic phase preferably down to −20° C., more preferably down to −30° C. and particularly preferably down to −40° C., enable clearing points preferably above 80° C., more preferably above 90° C. and particularly preferably above 100° C., simultaneously dielectric anisotropy values, $\Delta\epsilon$, preferably of $\geq 6$, more preferably $\geq 8$, and a high value for the specific resistance to be achieved, enabling excellent STN and MLC displays to be obtained. In particular, the mixtures are characterized by low operating voltages. The TN thresholds are preferably below 2.0 V, more preferably below 1.8 V, particularly preferably below 1.7 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975] are used, where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity, $\nu_{20}$, at 20° C. is preferably <60 mm²·s⁻¹, particularly preferably <50 mm²·s⁻¹. The rotational viscosity, $\gamma_1$, of the mixtures according to the invention at 20° C. is preferably <180 mPa·s, particularly preferably <150 mPa·s. The nematic phase range is preferably at least 90°, particularly preferably at least 100°. This range preferably extends at least from −20° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenyl-cyclohexanes of the formula

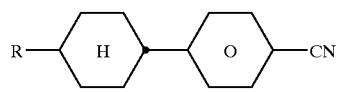

or esters of the formula

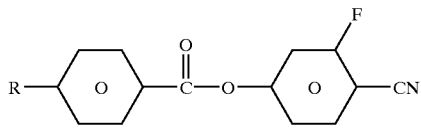

instead of the compounds of the formula I according to the invention.

The UV stability of the mixtures according to the invention is also considerably better, i.e., they exhibit a significantly smaller decrease in the HR on exposure to UV.

The media according to the invention are preferably based on a plurality of (preferably two or more) compounds of the formula I, i.e., the proportion of these compounds is preferably 5–95%, more preferably 10–60% and particularly preferably in the range 15–50%.

The individual compounds of the formulae II to XVIII and their sub-formulae which can be used in the media according to the invention are either known or they can be prepared analogously to the known compounds.

Preferred embodiments are indicated below:

The medium comprises one or more compounds of the formulae I1 to I32:

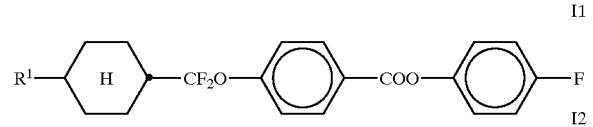

I1

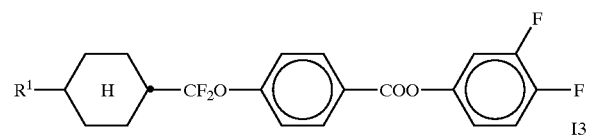

I2

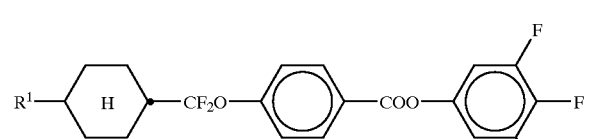

I3

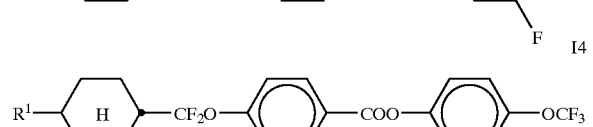

I4

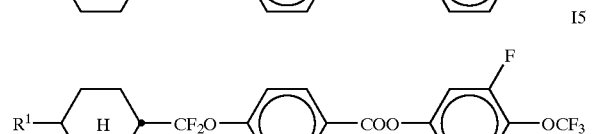

I5

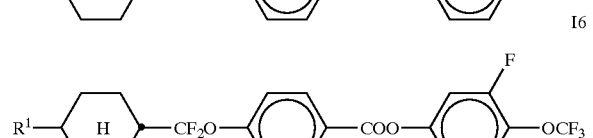

I6

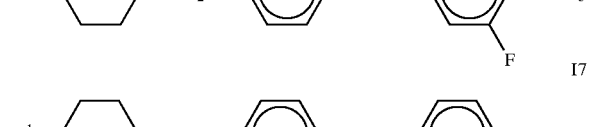

I7

I8

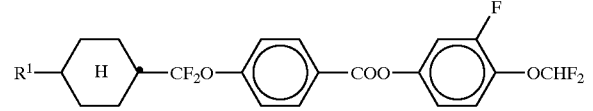

I9

-continued

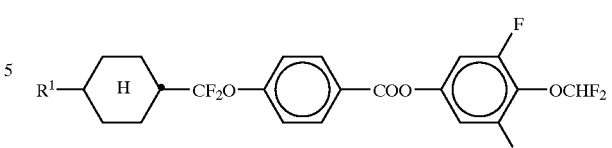

I9

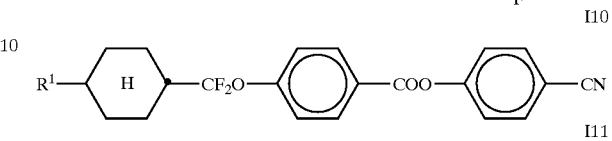

I10

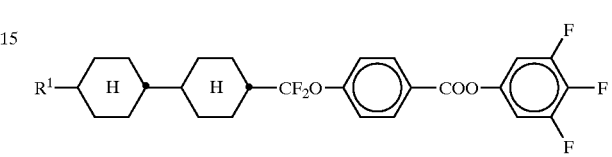

I11

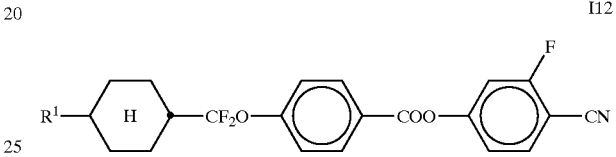

I12

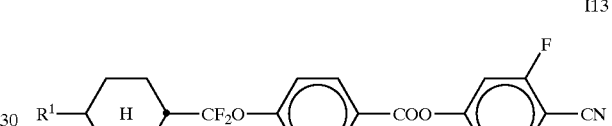

I13

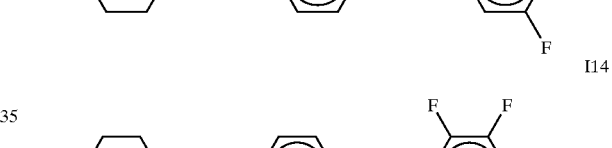

I14

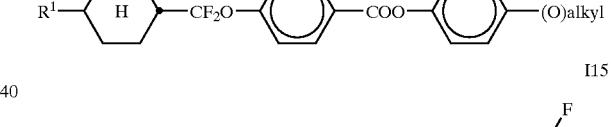

I15

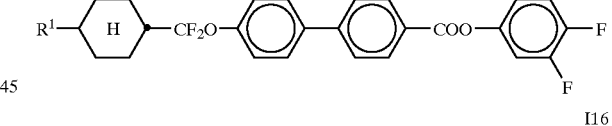

I16

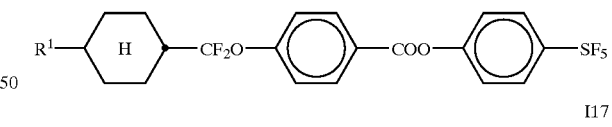

I17

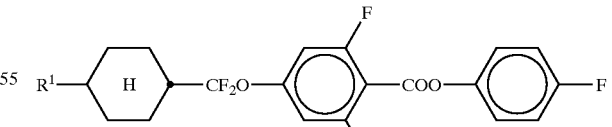

I18

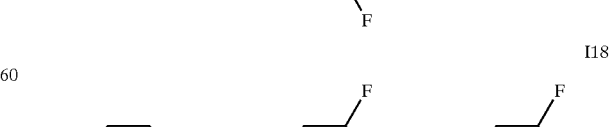

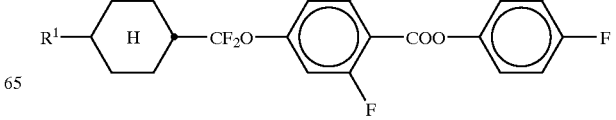

-continued

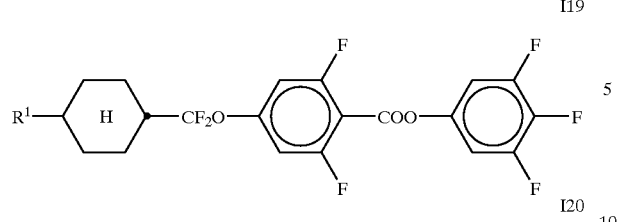
I19

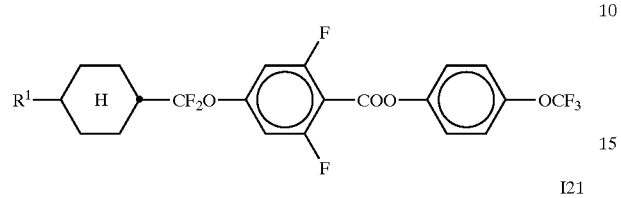
I20

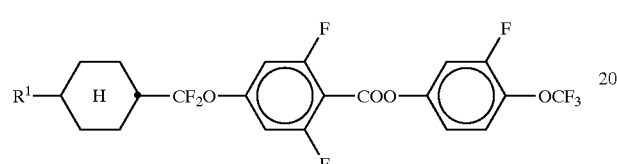
I21

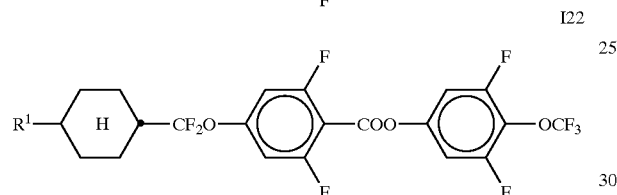
I22

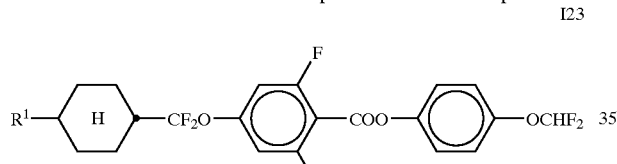
I23

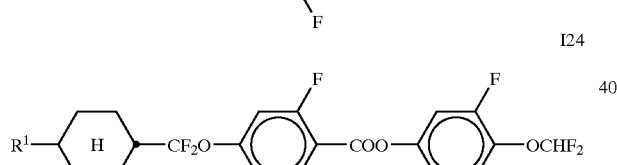
I24

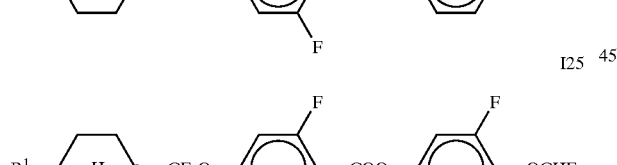
I25

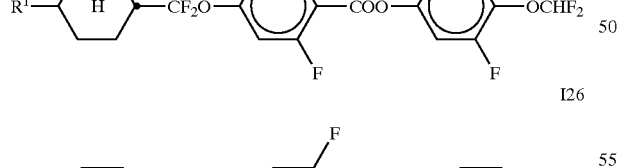
I26

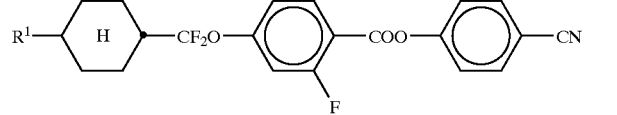
I27

-continued

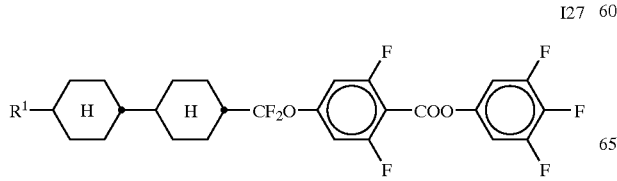
I28

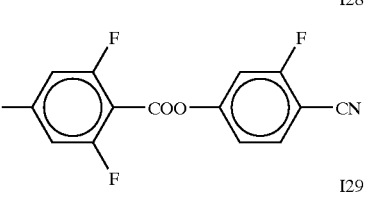
I29

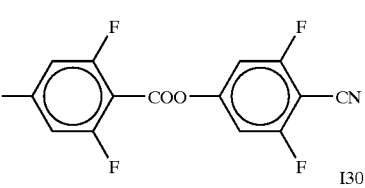
I30

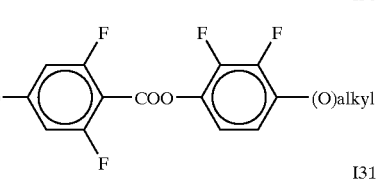
I31

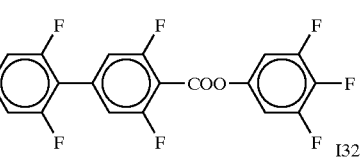
I32

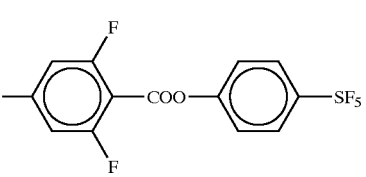

X is preferably F, Cl, CN, OCN, NCS, SCN, $SF_5$, $OCH_3$, $CH_3$, $OC_2H_5$, $C_2H_5$, $OC_3H_7$, $C_3H_7$, $CF_3$, $C_2F_5$, $C_3F_7$, $CF_2H$, $OCF_3$, $OCF_2H$, $OCFHCF_3$, $OCFHCH_2F$, $OCFHCHF_2$, $OCF_2CH_3$, $OCF_2CH_2F$, $OCF_2CHF_2$, $OCF_2CF_2CF_2H$, $OCF_2CF_2CH_2F$, $OCFHCF_2CF_3$, $OCFHCF_2CHF_2$, $OCFHCFHCF_3$, $OCH_2CF_2CF_3$, $OCF_2CF_2CF_3$, $OCF_2CFHCHF_2$, $OCF_2CH_2CHF_2$, $OCFHCF_2CHF_2$, $OCFHCFHCHF_2$, $OCFHCH_2CF_3$, $OCH_2CFHCF_3$, $OCH_2CF_2CHF_2$, $OCF_2CFHCH_3$, $OCF_2CH_2CHF_2$, $OCFHCF_2CH_3$, $OCFHCFHCHF_2$, $OCFHCH_2CF_3$, $OCH_2CF_2CHF_2$, $OCH_2CFHCHF_2$, $OCF_2CH_2CH_3$, $OCFHCFHCH_3$, $OCFHCH_2CHF_2$, $OCH_2CF_2CH_3$, $OCH_2CFHCHF_2$, $OCH_2CH_2CHF_2$, $OCHFCH_2CH_3$, $OCH_2CFHCH_3$, $OCH_2CH_2CHF_2$, $OCClFCF_3$, $OCClFCClF_2$, $OCClFCHF_2$, $OCFHCCl_2F$, $OCClFCHF_2$, $OCClFCClF_2$, $OCF_2CHCl_2$, $OCF_2CHCl_2$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CHF_2$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCHF_2$, $OCF_2CF_2CCl_2F$, $OCF_2CCl_2CHF_2$, $OCF_2CH_2CClF_2$, $OCClFCF_2CFH_2$, $OCFHCF_2CCl_2F$, $OCClFCFHCHF_2$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCH_3$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, OCF$_2$CH$_2$CCl$_2$H, OCClFCFHCH$_3$, OCF$_2$CClFCCl$_2$H, OCClFCH$_2$CFH$_2$, OCFHCCl$_2$CFH$_2$, OCCl$_2$CF$_2$CH$_3$, OCH$_2$CF$_2$CClH$_2$, OCCl$_2$CFHCFH$_2$, OCH$_2$CClFCFCl$_2$, OCH$_2$CH$_2$CF$_2$H, OCClHCClHCF$_2$H, OCH$_2$CCl$_2$CF$_2$H, OCClFCH$_2$CH$_3$, OCFHCH$_2$CCl$_2$H, OCClHCFHCClH$_2$, OCH$_2$CFHCCl$_2$H, OCCl$_2$CH$_2$CF$_2$H, OCH$_2$CCl$_2$CF$_2$H, CH=CF$_2$, OCH=CF$_2$, CF=CF$_2$, OCF=CF$_2$, CF=CHF, OCF=CHF, CH=CHF, OCH=CHF, CF$_2$CH$_2$CF$_3$ or CF$_2$CHFCF$_3$ in particular F, Cl, CN, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$, CH=CF$_2$, OCH$_3$, OC$_2$H$_5$ or OC$_3$H$_7$ The medium additionally comprises one or more compounds selected from the group consisting of compounds of the general formulae II to VIII:

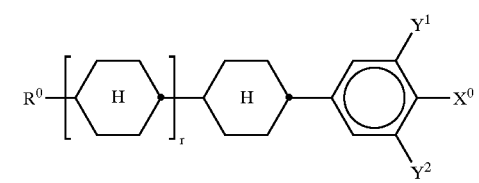

II

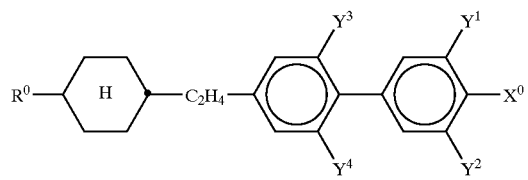

III

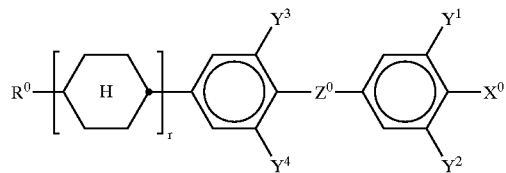

IV

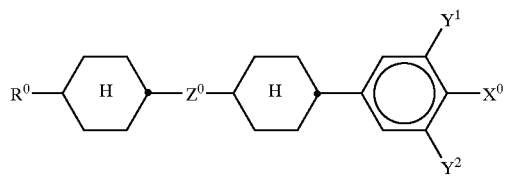

V

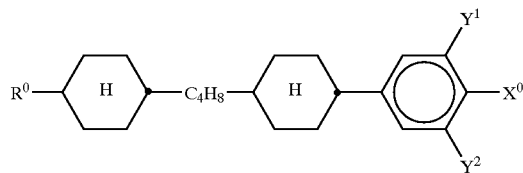

VI

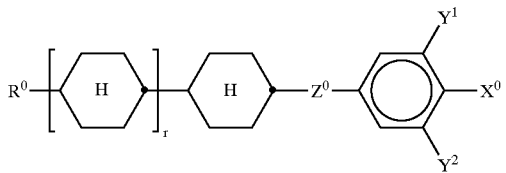

VII

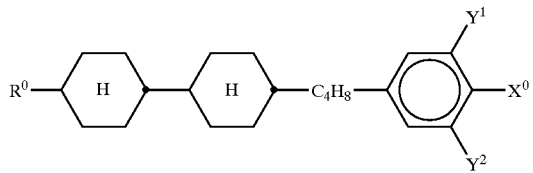

VIII in which the individual radicals have the following meanings:

R$^0$: n-alkyl, alkoxy, oxaalkyl, fluoroalkyl or alkenyl, each having up to 9 carbon atoms X$^0$: F, Cl, halogenated alkyl, halogenated alkenyl, halogenated alkenyloxy or halogenated alkoxy having from 1 to 6 carbon atoms, Z$^0$: —C$_2$H$_4$—, —CH=CH—, —CH$_2$O—, —COO—, —OCH$_2$—, —OCF$_2$—, —CF$_2$O—, —CF=CF—, —C$_2$F$_4$—, —CH$_2$CF$_2$— or CF$_2$CH$_2$—, Y$^1$, Y$^2$, Y$^3$ and Y$^4$: each, independently of one another, H or F, and r: 0 or 1.

The compound of the formula IV is preferably of one of formulae IVa–IVh:

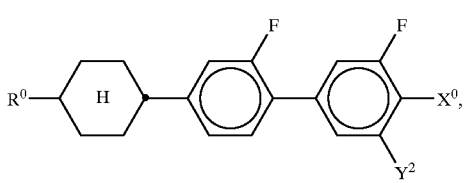

IVa

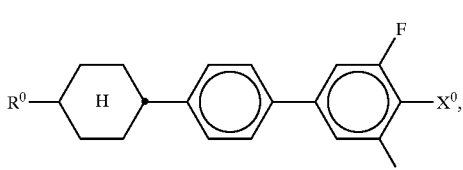

IVb

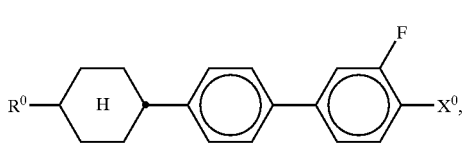

IVc

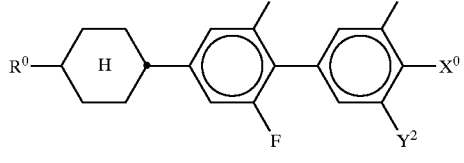

IVd

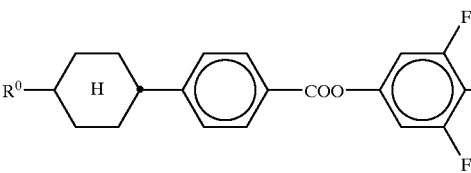

IVe

-continued
IVf
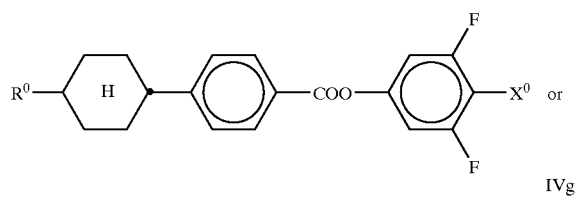
or
IVg
IVh
The medium additionally comprises one or more dioxanes of the formulae D1 to D4:
D1
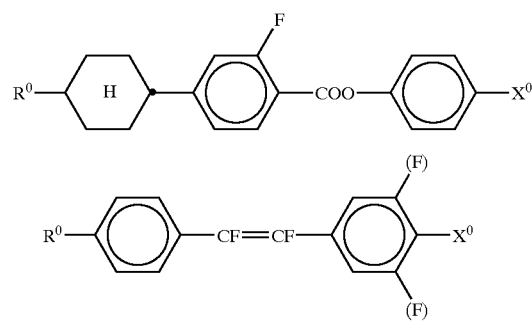
D2
D3
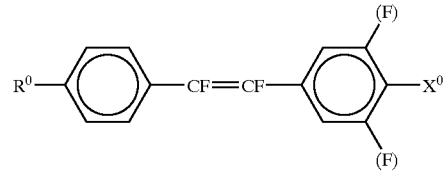
D4
in which $R^0$ is as defined above.
The medium additionally comprises one or more compounds selected from the group consisting of compunds of the general formulae IX to XVIII:
IX
X
XI
XII
XIII
XIV
XV
XVI
XVII
XVIII -continued

XVIII

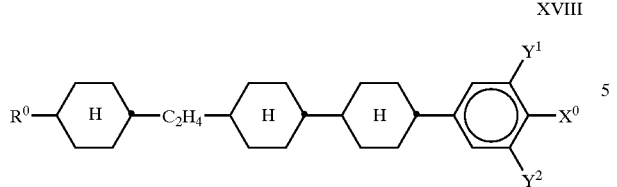

in which R⁰, X⁰, Y¹ and Y² are each, independently of one another, as defined above. $Y^3$ and $Y^4$ are each, independently of one another, H or F. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium additionally comprises one or more compounds having fused rings, of the formulae A-1 to A-6:

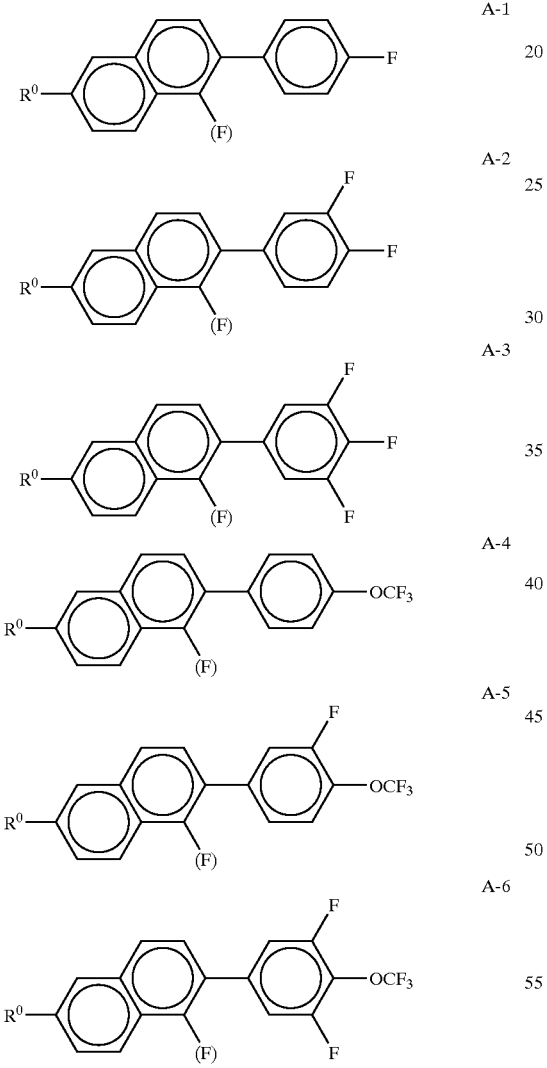

in which $R^0$ is as defined above, and (F) is an optional fluoro group.

- The proportion of the compounds of the formulae A-1 to A-6 is preferably 0–20% by weight, more preferably 3–15% by weight, in particular 3–10% by weight;
- The proportion of compounds of the formulae I to VIII together in the mixture as a whole is at least 30% by weight, preferably at least 50% by weight;
- The proportion of compounds of the formula I in the mixture as a whole is preferably from 1 to 50% by weight, more preferably from 2 to 30% by weight and particularly preferably from 5 to 25% by weight;
- The proportion of compounds of the formulae II to VIII in the mixture as a whole is preferably from 20 to 80% by weight;

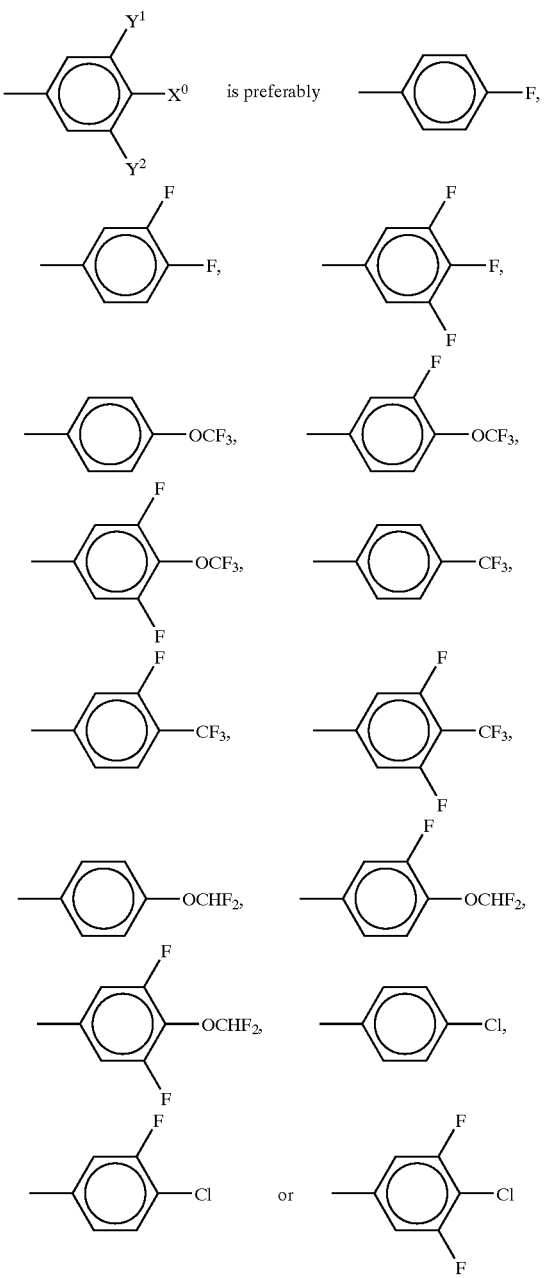

- The medium comprises one or more compounds of the formulae II, III, IV, V, VI, VII or VIII;
- $R^0$ is straight-chain alkyl or alkenyl having from 2 to 7 carbon atoms;
- The medium essentially consists of compounds of the formulae I to VIII;
- The medium preferably comprises one, two or three compounds of the formula I;

The medium comprises a mixture of compounds of the formula I in which $R^1$ is methyl, ethyl, n-$C_3H_7$, n-$C_4H_9$, n-$C_5H_{11}$ or n-$C_6H_{11}$;

The medium comprises further compounds, preferably selected from the following group consisting of compounds of the general formulae XIX to XXII:

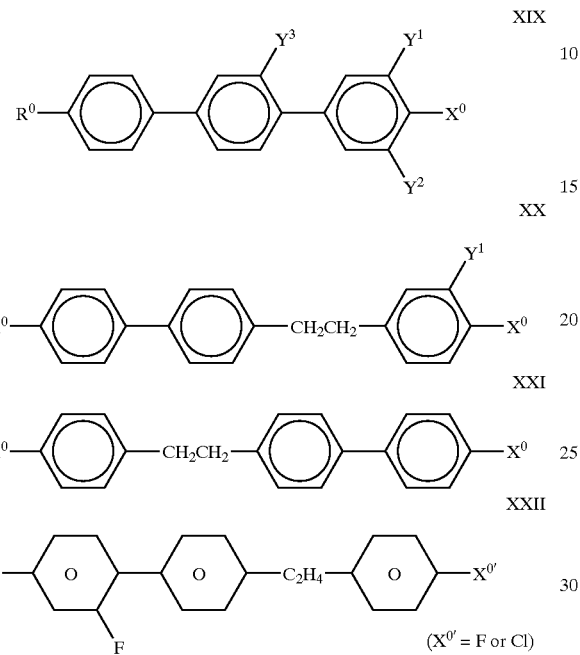

in which $R^0$, $X^0$, $Y^1$, $Y^2$ and $Y^3$ are as defined above, and the 1,4-phenylene rings may be substituted by methyl, CN, chlorine or fluorine. The 1,4-phenylene rings are preferably monosubstituted or polysubstituted by fluorine atoms.

The medium preferably comprises bicyclic carbocyclic compounds of the formula XXIII

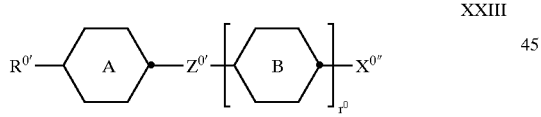

where

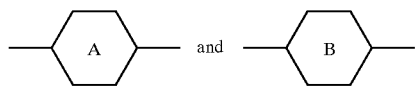

and are each, independently of one another,

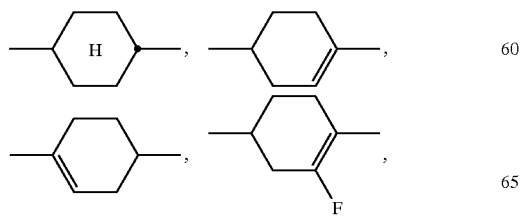

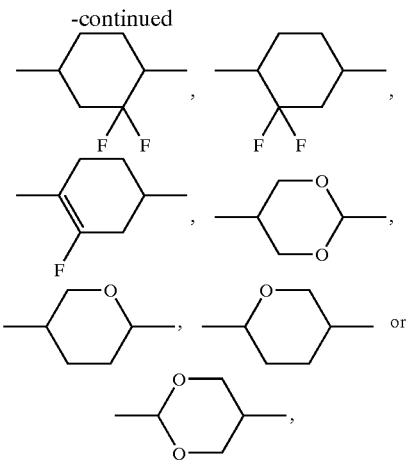

$Z^{0'}$ is a single bond, —$C_2H_4$—, —$C_4H_8$—, —COO—, —$CH_2O$—, —$OCH_2$—O—CO—, —$CF_2O$— or —$OCF_2$—, $r^0$ is 1 or 2, $R^{0'}$ is as defined for $R^0$, and $X^{0''}$ is $OCF_3$, F, Cl, $CF_3$, alkyl, alkoxy or alkenyl.

Preferred sub-formulae of the formula XXIII are

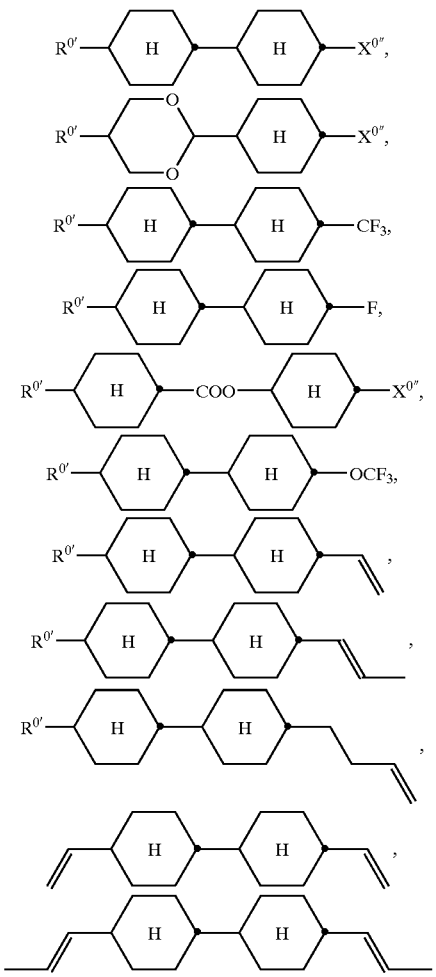

Very particularly preferred sub-formulae of the formula XXIII are

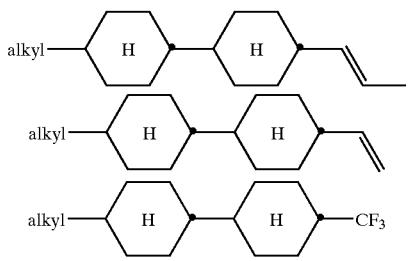

where
alkyl is a straight-chain alkyl radical having 1–8 carbon atoms, in particular having 2–5 carbon atoms.

The medium preferably comprises two or three compounds of the formula XXIII.

The proportion of compounds of the formula XXIII in the medium according to the invention is preferably 5–40% by weight, in particular 5–35% by weight.

The I: (II+III+IV+V+VI+VII+VIII) weight ratio is preferably from 1:10 to 10:1.

The medium essentially consists of compounds selected from the group consisting of the general formulae I to XVIII.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably=1 and m is preferably from 1 to 6.

It has been found that even a relatively small proportion of compounds of the formula I mixed with conventional liquid-crystal materials, but in particular with one or more compounds of the formulae II, III, IV, V, VI, VII and/or VIII, results in a significant lowering of the threshold voltage and in low birefringence values, with broad nematic phases with low smectic-nematic transition temperatures being observed at the same time, improving the shelf life. Particular preference is given to mixtures which, besides one or more compounds of the formula I, comprise one or more compounds of the formula IV, in particular compounds of the formula IVa in which $X^0$ is F, $OCHF_2$ or $OCF_3$. The compounds of the formulae I to VIII are colorless, stable and readily miscible with one another and with other liquid-crystalline materials. Furthermore, the mixtures according to the invention are distinguished by very high clearing points, the values for the rotational viscosity $\gamma_1$ being comparatively low.

Through a suitable choice of the meanings of $R^0$ and $X^0$, the addressing times, the threshold voltage, the steepness of the transmission characteriztic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteriztic lines in TN cells With a 90° twist (in order to achieve grey shades) and steeper transmission characteriztic lines in STN, SBE and OMI cells (greater multiplexability), and vice versa.

The optimum mixing ratio of the compounds of the formulae I and II+III+IV+V+VI+VII+VIII depends substantially on the desired properties, on the choice of the components of the formulae I, II, III, IV, V, VI, VII and/or VIII, and the choice of any other components that may be present. Suitable mixing ratios within the range given above can easily be determined from case to case.

The total amount of compounds of the formulae I to XVIII in the mixtures according to the invention is not crucial. The mixtures can therefore comprise one or more further components for the purposes of optimizing various properties. However, the observed effect on the addressing times and the threshold voltage is generally greater, the higher the total concentration of compounds of the formulae I to XVIII.

In a particularly preferred embodiment, the media according to the invention comprise compounds of the formulae II to VIII (preferably II, III and/or IV, in particular IVa) in which $X^0$ is F, $OCF_3$, $OCHF_2$, $OCH=CF_2$, $OCF=CF_2$ or $OCF_2$—$CF_2H$. A favorable synergistic effect with the compounds of the formula I results in particularly advantageous properties. In particular, mixtures comprising compounds of the formula I and of the formula IVa are distinguished by their low threshold voltages.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes, stabilizers or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index. $\Delta \in$ denotes the dielectric anisotropy ($\Delta \in = \in_\| - \in_\perp$, where $\in_\|$ denotes the dielectric constant parallel to the longitudinal molecular axes and $\in_\perp$ denotes the dielectric constant perpendicular thereto). The electro-optical data were measured in a TN cell at the 1st minimum (i.e. at a d·$\Delta n$ value of 0.5 μm) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 or 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nOCCF2.F.F | $C_nH_{2n+1}$ | OCH$_2$CF$_2$H | F | F |
| V-n | CH$_2$=CH | $C_nH_{2n+1}$ | H | H |

Preferred mixture components of the mixture concept according to the invention are given in Tables A and B.

TABLE A

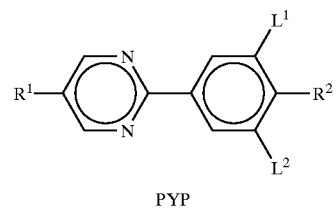

PYP

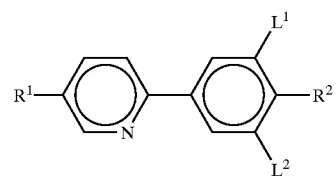

PYRP

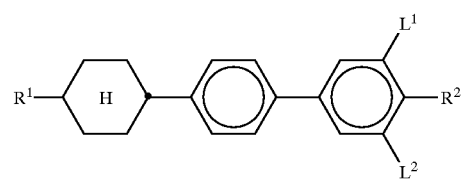

BCH

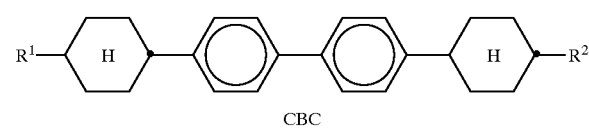

CBC

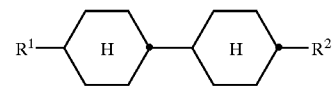

CCH

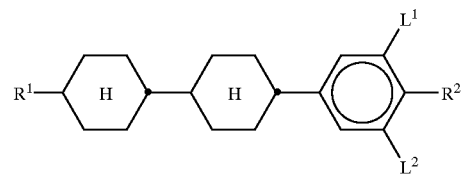

CCP

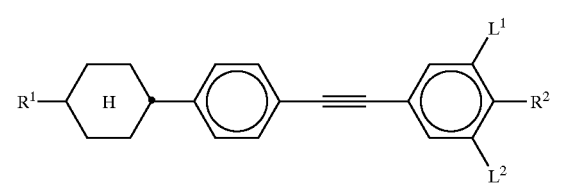

CPTP

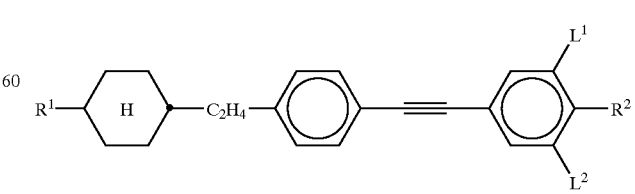

CEPTP

TABLE A-continued
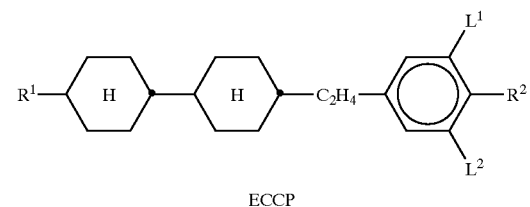
ECCP
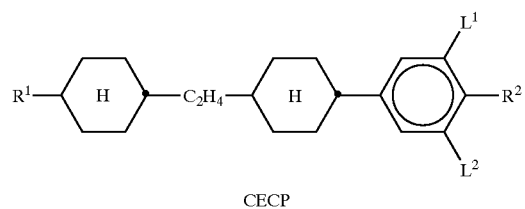
CECP
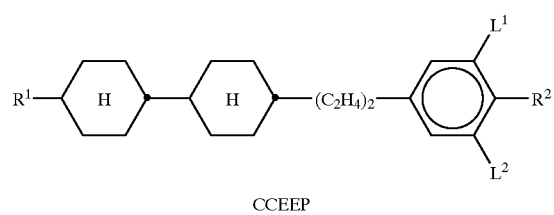
CCEEP
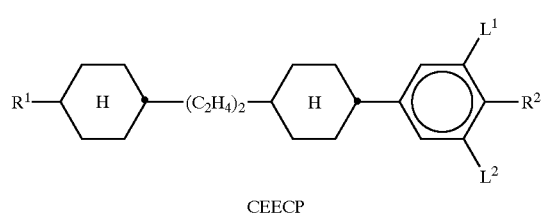
CEECP
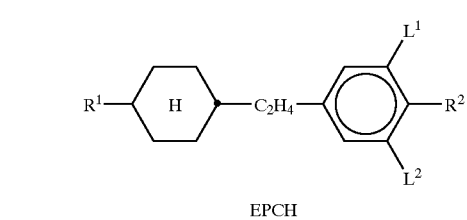
EPCH
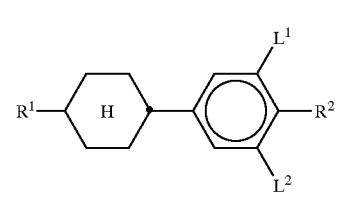
PCH
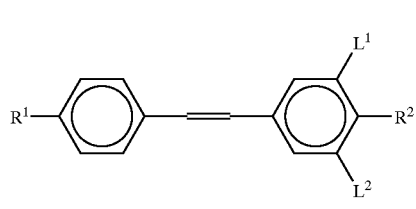
PTP
TABLE A-continued
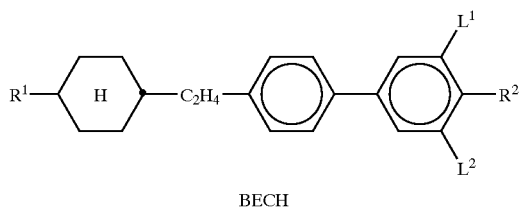
BECH
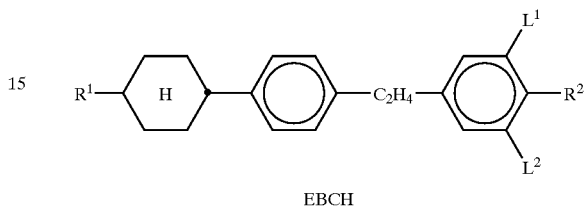
EBCH
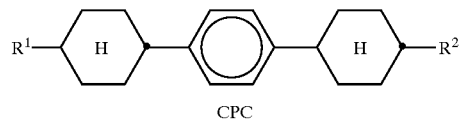
CPC
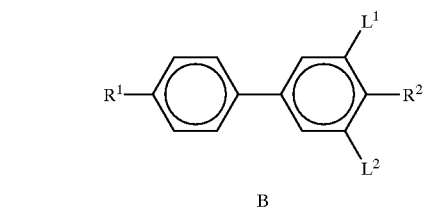
B
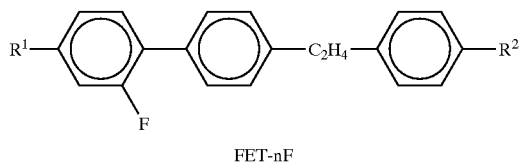
FET-nF
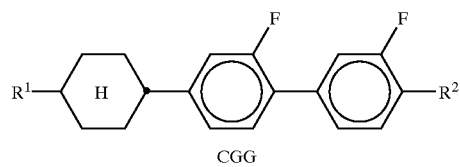
CGG
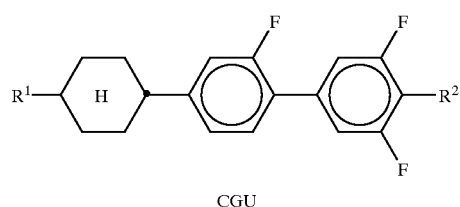
CGU
CFU TABLE B
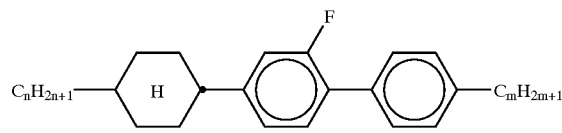
BCH-n.Fm
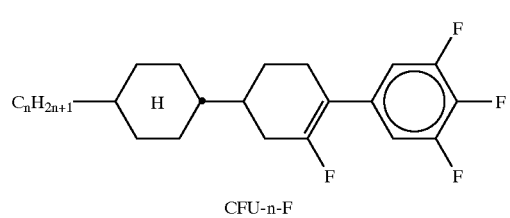
CFU-n-F
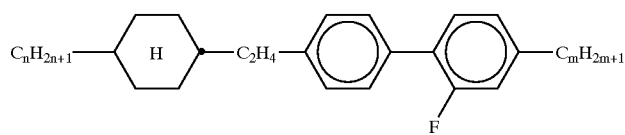
Inm
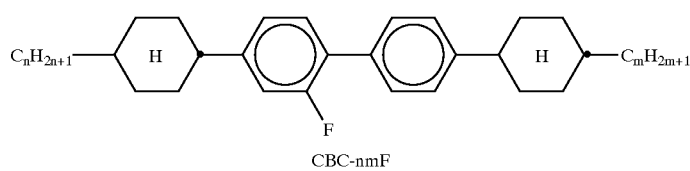
CBC-nmF
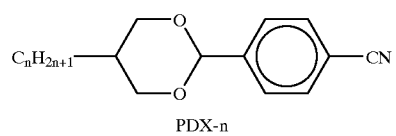
PDX-n
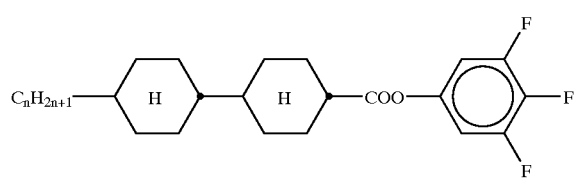
CCZU-n-F
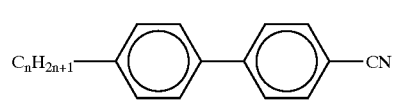
K3n
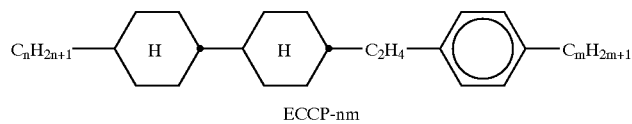
ECCP-nm
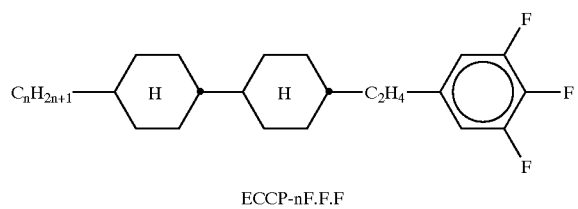
ECCP-nF.F.F TABLE B-continued
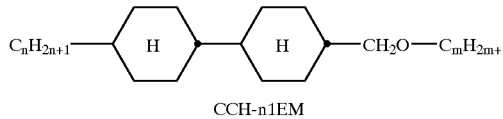
CCH-n1EM
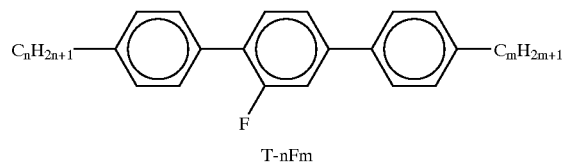
T-nFm
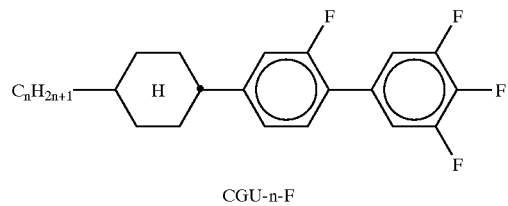
CGU-n-F
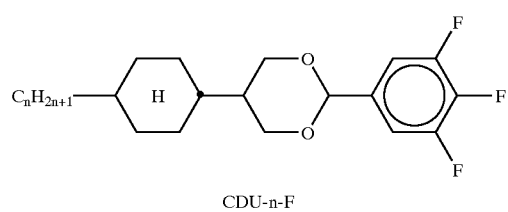
CDU-n-F
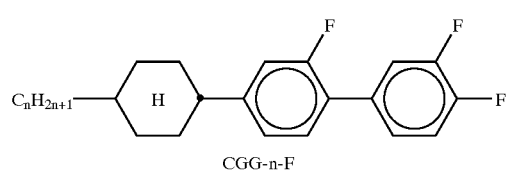
CGG-n-F
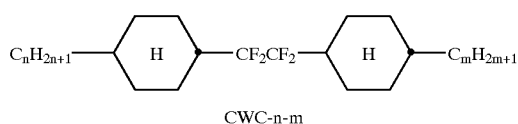
CWC-n-m
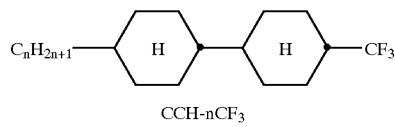
CCH-nCF$_3$
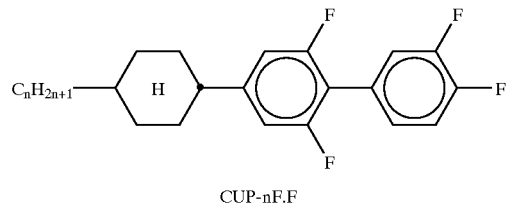
CUP-nF.F
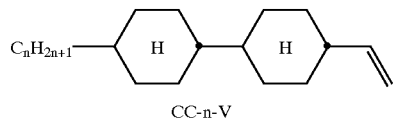
CC-n-V TABLE B-continued
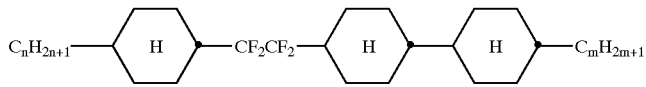
CWCC-n-m
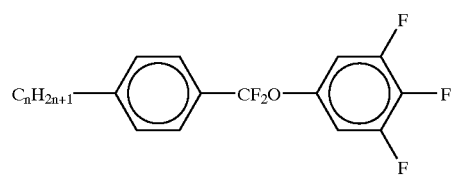
PQU-n-F
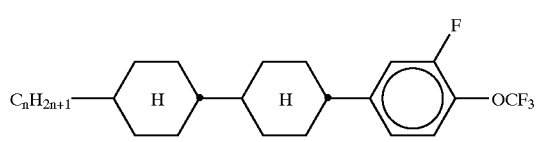
CCG-n-OT
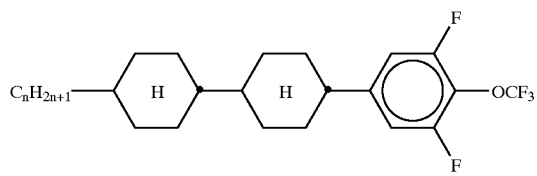
CCU-n-OT
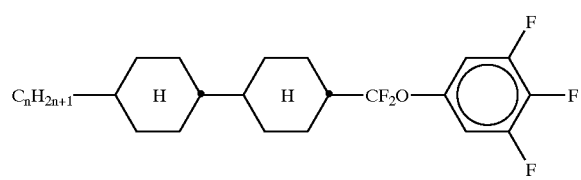
CCQU-n-F
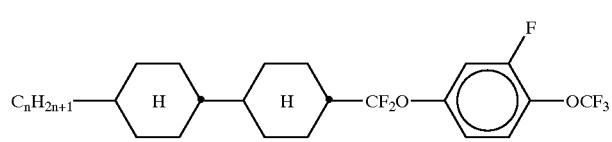
CCQG-n-OT
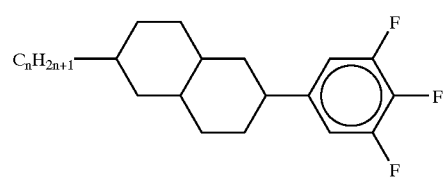
Dec-U-n-F
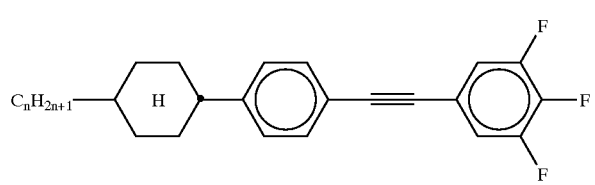
CPTU-n-F TABLE B-continued
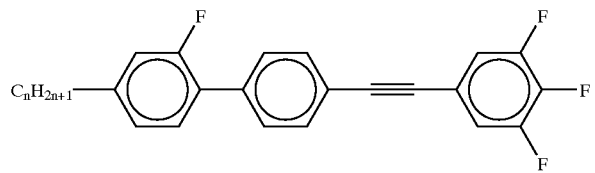
GPTU-n-F
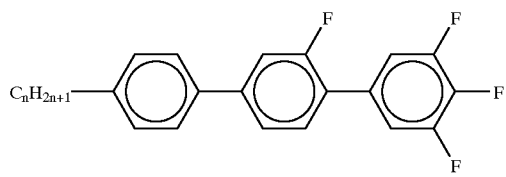
PGU-n-F
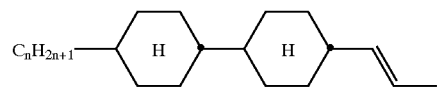
CC-n-V1
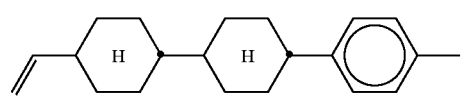
CCP-V-1
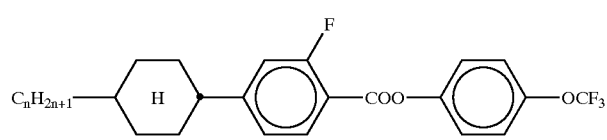
CGZP-n-OT
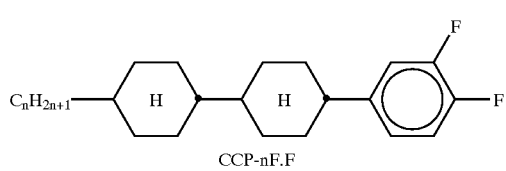
CCP-nF.F
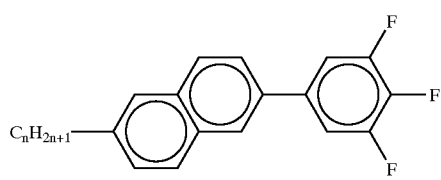
Nap-U-n-F
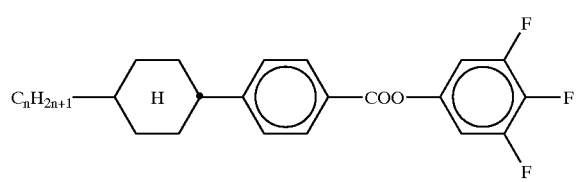
CPZU-n-F TABLE B-continued
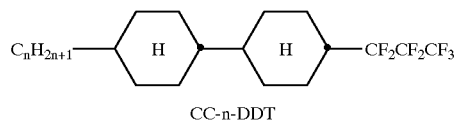
CC-n-DDT
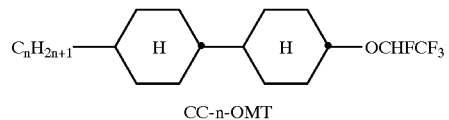
CC-n-OMT
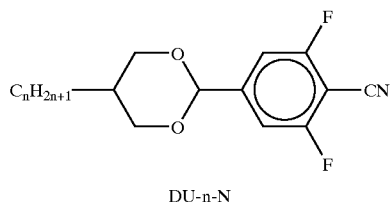
DU-n-N
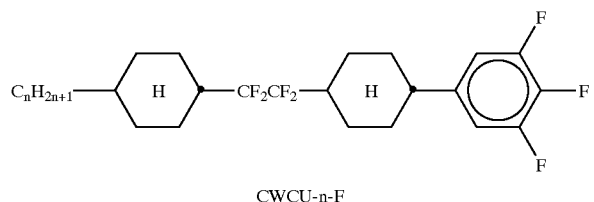
CWCU-n-F
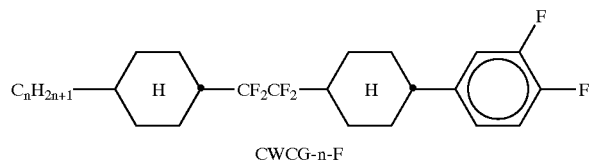
CWCG-n-F
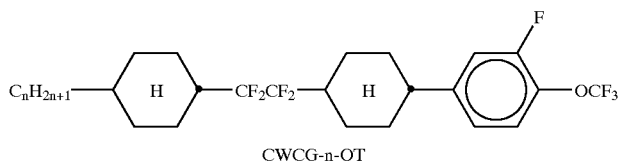
CWCG-n-OT
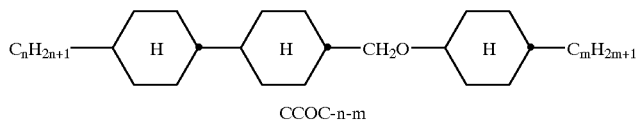
CCOC-n-m
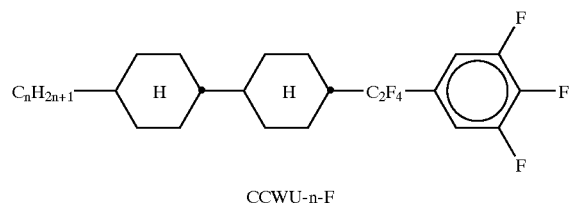
CCWU-n-F TABLE B-continued
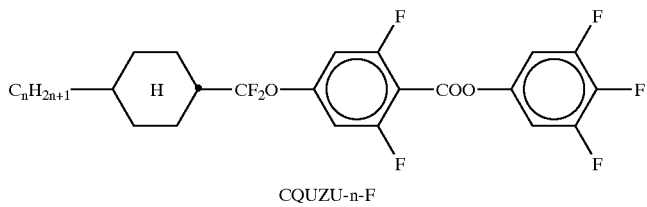
CQUZU-n-F
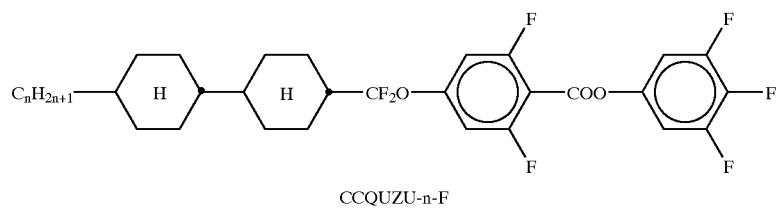
CCQUZU-n-F
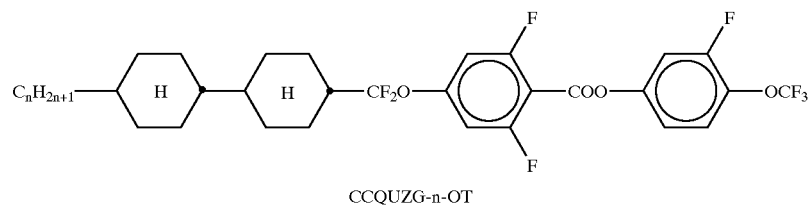
CCQUZG-n-OT
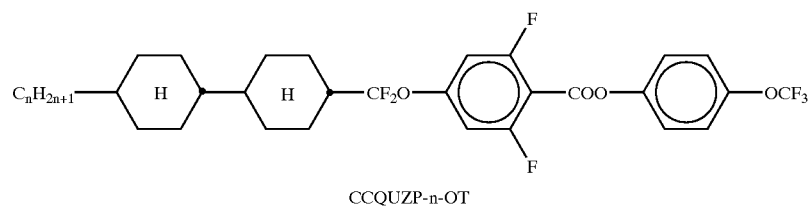
CCQUZP-n-OT
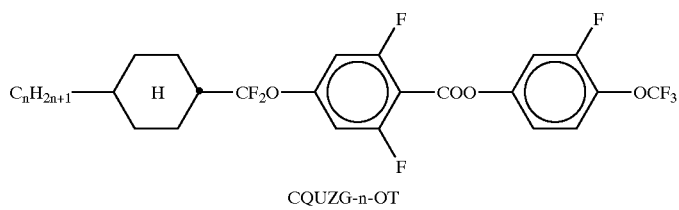
CQUZG-n-OT
TABLE C
Table C shows possible dopants which are generally added to the compounds according to the invention.
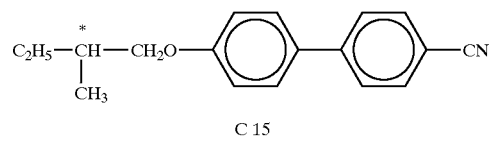
C 15
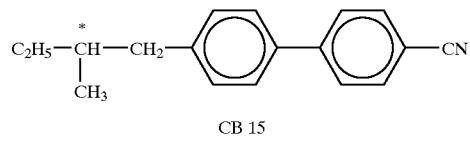
CB 15

TABLE C-continued
Table C shows possible dopants which are generally added to the compounds according to the invention.
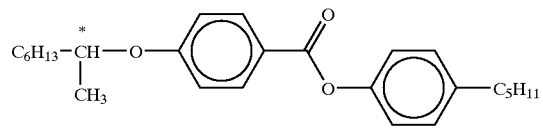
CM 21
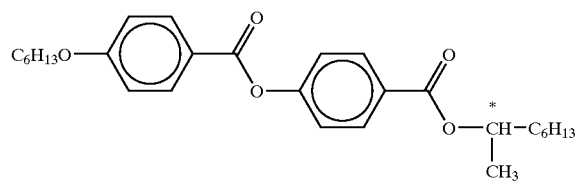
R/S-811
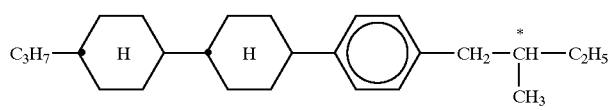
CM 44
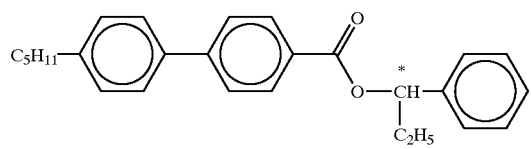
CM 45
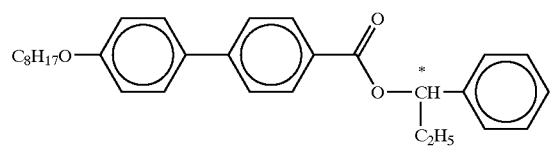
CM 47
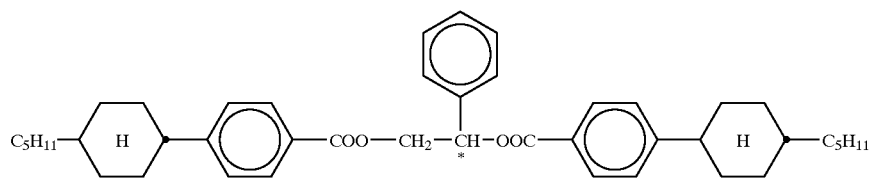
R/S-1011
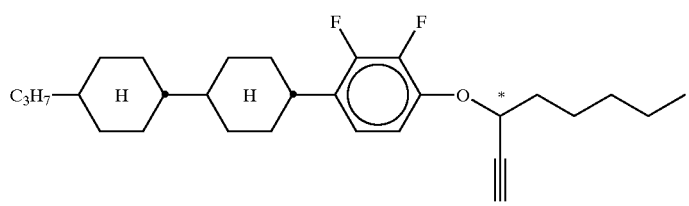
R/S-3011

TABLE C-continued
Table C shows possible dopants which are generally added to the compounds according to the invention.
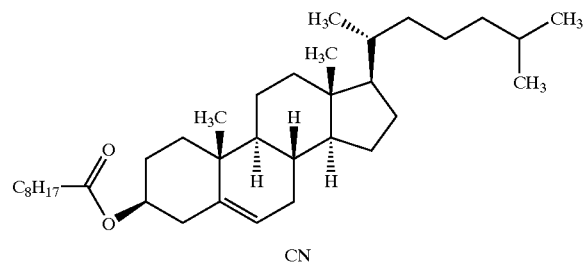
CN
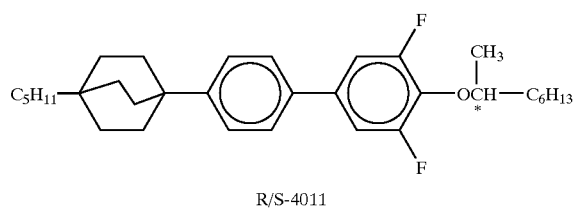
R/S-4011
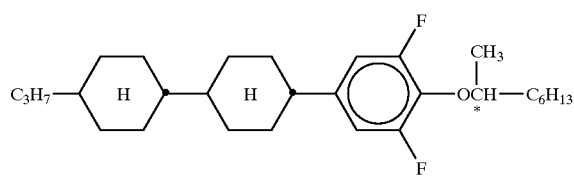
R/S-2011
TABLE D
Stabilisers which can be added, for example, to the mixtures according to the invention are shown below.
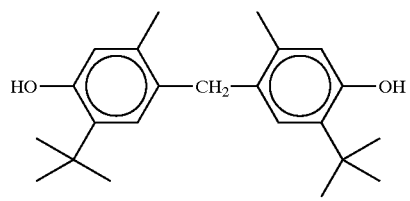
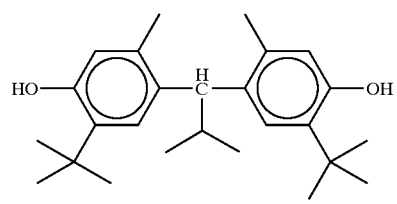
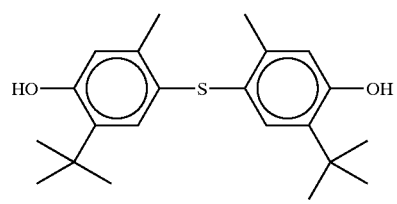

TABLE D-continued
Stabilisers which can be added, for example, to the mixtures according to the invention are shown below.
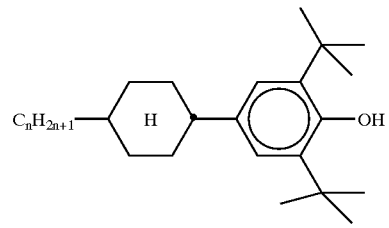
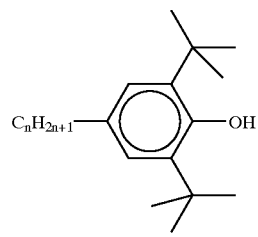
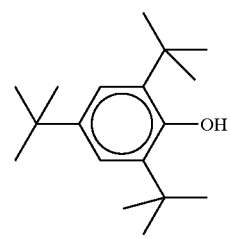
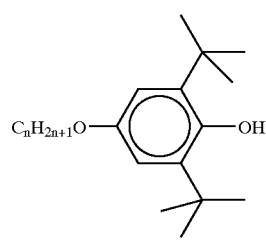
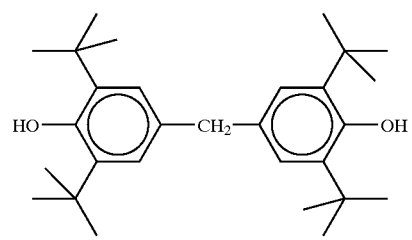
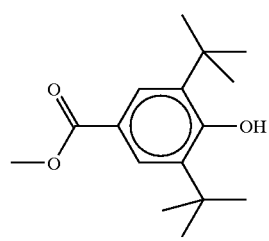

TABLE D-continued
Stabilisers which can be added, for example, to the mixtures according to the invention are shown below.
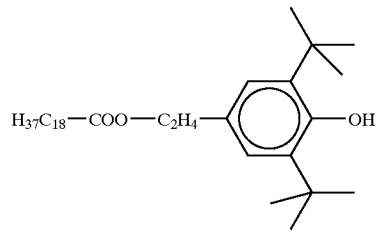
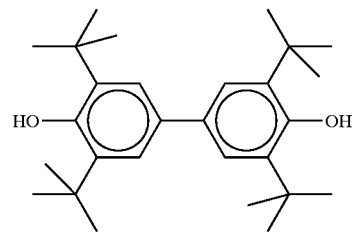
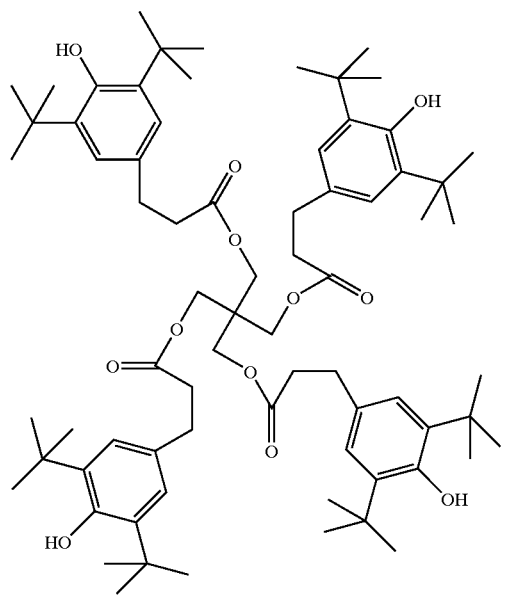
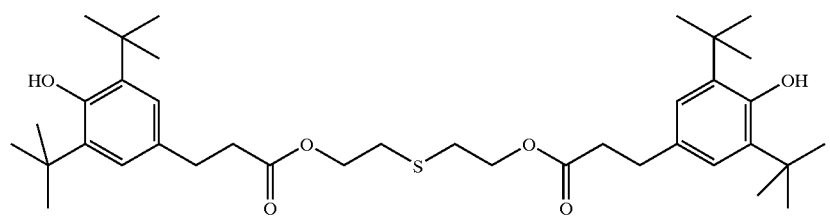

TABLE D-continued
Stabilisers which can be added, for example, to the mixtures according to the invention are shown below.
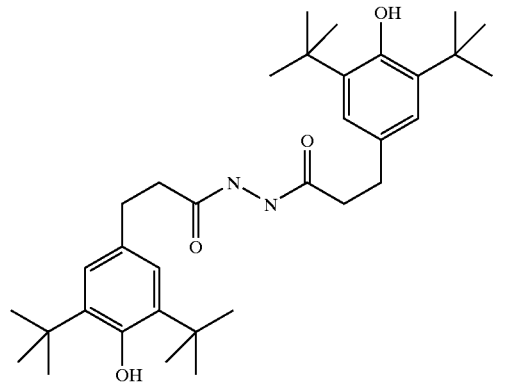
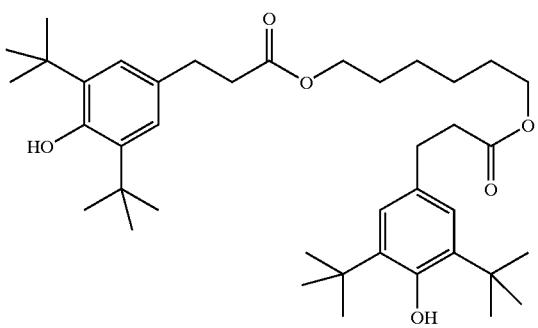
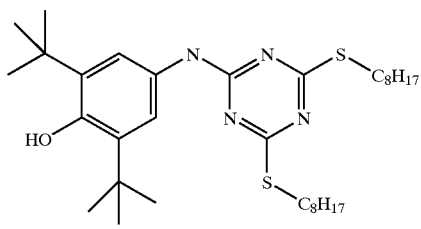
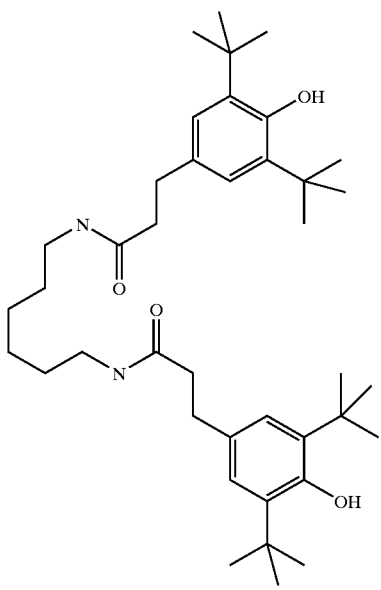

TABLE D-continued
Stabilisers which can be added, for example, to the mixtures according to the invention are shown below.
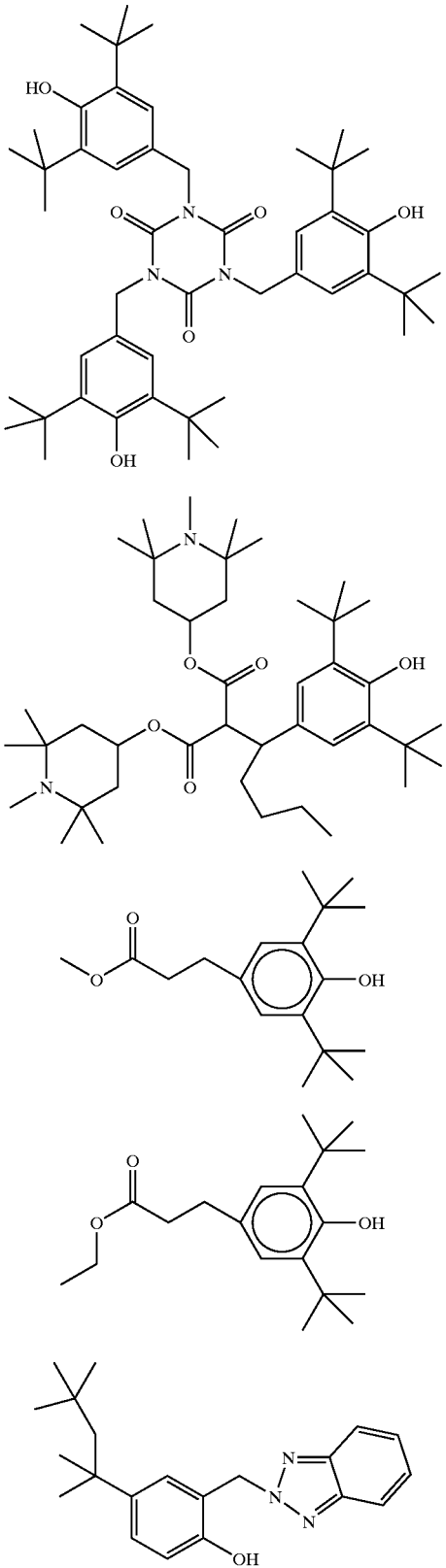

TABLE D-continued
Stabilisers which can be added, for example, to the mixtures according to the invention are shown below.
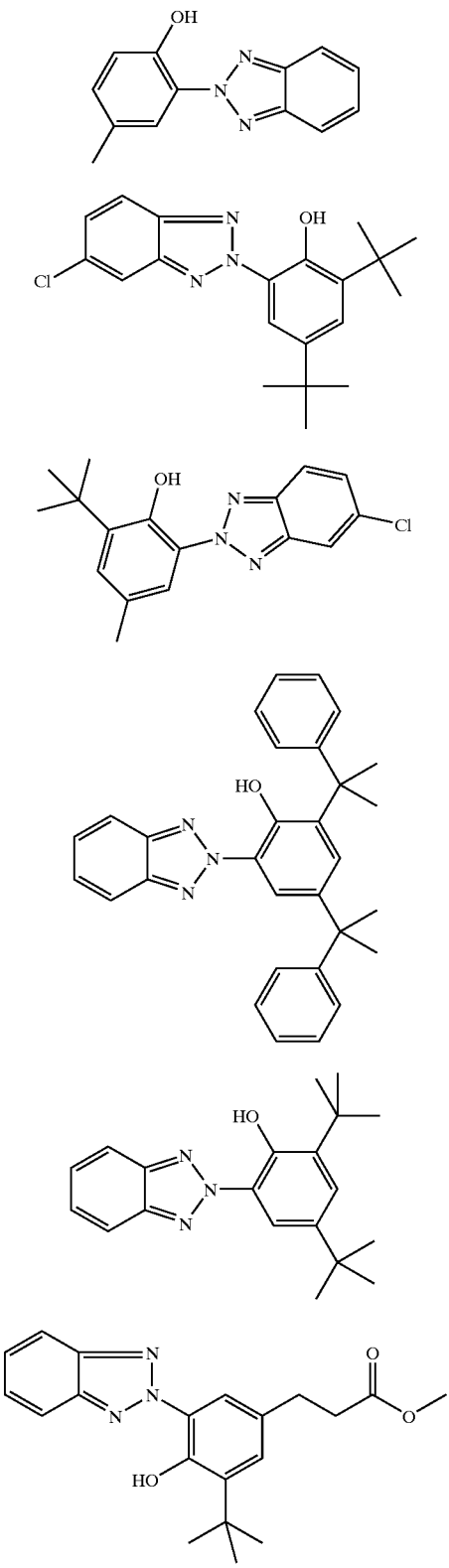

TABLE D-continued
Stabilisers which can be added, for example, to the mixtures according to the invention are shown below.
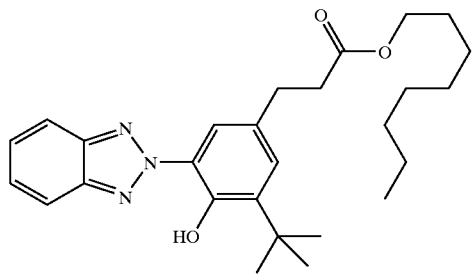
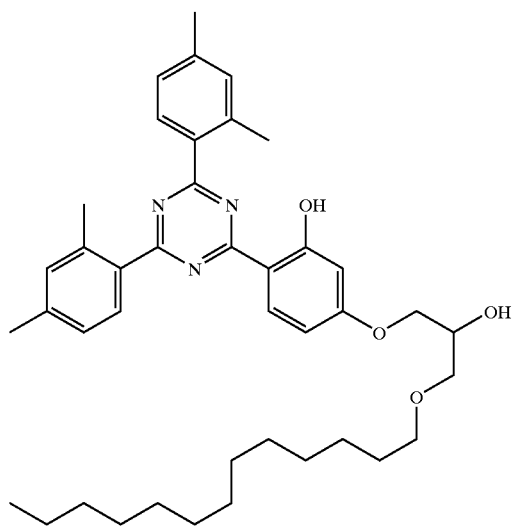
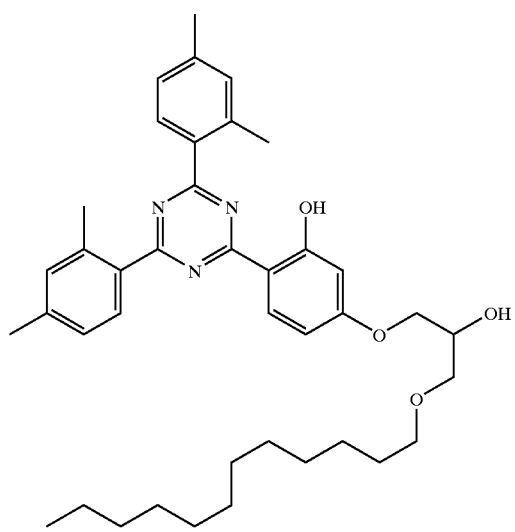

TABLE D-continued

Stabilisers which can be added, for example, to the mixtures according to the invention are shown below.

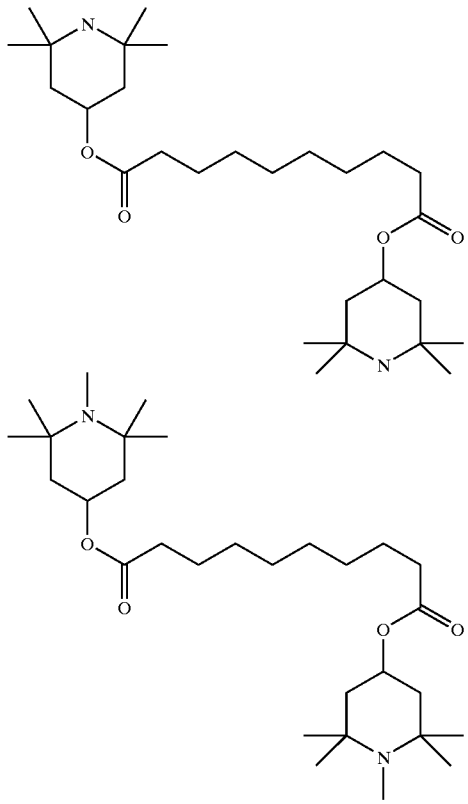

Besides one or more compounds of the formula I, particularly preferred mixtures comprise one, two, three, four, five or more compounds from Table B.

The entire disclosures of all applications, patents and publications, cited above and of corresponding German Patent application No. 102 46 117.1, filed Sep. 30, 2002, are hereby incorporated by reference.

| | |
|---|---|
| n-BuLi | 1.6 molar solution of n-butyllithium in n-hexane |
| DMAP | 4-(dimethylamino)pyridine |
| THF | tetrahydrofuran |
| DCC | N,N'-dicyclohexylcarbodiimide |
| RT | room temperature |

EXAMPLES

The following examples are intended to explain the invention without restricting it. Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. $\Delta n$ denotes optical anisotropy (589 nm, 20° C.). The flow viscosity $v_{20}$ (mm²/sec) and the rotational viscosity $\gamma_1$ [mPa·s] were each determined at 20° C.

In the examples, "conventional work-up" means that water is added if necessary, the mixture is extracted with dichloromethane, diethyl ether, methyl tert-butyl ether or toluene, the phases are separated, the organic phase is dried and evaporated, and the product is purified by distillation under reduced pressure or crystallization and/or chromatography. The following abbreviations are used:

Example 1

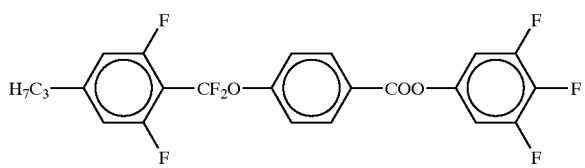

Step 1.1

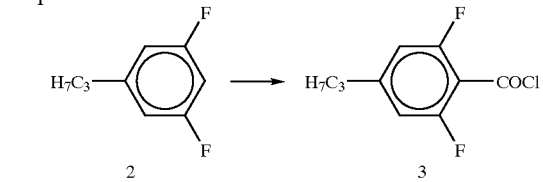

A solution of 0.2 mol of 2 in 300 ml of THF is treated with 0.21 mol of lithium diisopropylamide (LDA; 1 M in THF) at −40° C. After 0.5 hour, a vigorous stream of $CO_2$ is passed in. The reaction mixture is poured into 1.5 l of ice-cold 1 N HCl. The solution is extracted with CH$_2$Cl$_2$, and the combined organic extracts are dried over Na$_2$SO$_4$ and evaporated to dryness. For purification, the crude product is recrystallized from toluene. The carboxylic acid obtained in this way is dissolved in 200 ml of SOCl$_2$ and, after addition of 0.1 ml of DMF, heated at the boil for 3 hours. The excess SOCl$_2$ is removed by distillation.

Step 1.2

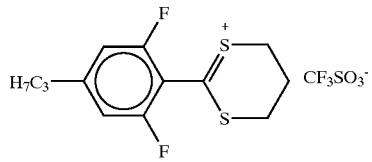

Firstly 0.11 mol of propane-1,3-dithiol, then 0.25 mol of trifluoromethane-sulfonic acid are added to 0.1 mol of 3 at 0° C. The mixture is stirred for 1 hour with ice cooling, then 0.4 mol of acetic anhydride is allowed to run in slowly. After a further hour, 500 ml of diethyl ether are added, and the precipitated dithianylium salt 4 is filtered off with suction and dried under reduced pressure: yield 82%.

Step 1.3

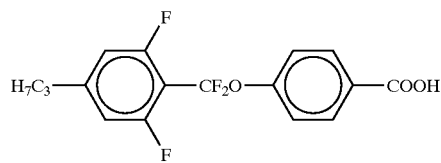

A suspension of 0.1 mol of 4 in 300 ml of CH$_2$Cl$_2$ is cooled to −70° C., and a mixture of 0.15 mol of ethyl 4-hydroxybenzoate, 0.17 mol of NEt$_3$ and 100 ml of CH$_2$Cl$_2$ is added dropwise. After 5 minutes, firstly 0.5 mol of NEt$_3$·3HF and, after a further 5 minutes, 0.5 mol of Br$_2$ are added dropwise. The mixture is stirred at −70° C. for 1 hour, then allowed to come to room temperature, and the orange-yellow solution is poured into ice-cold 0.1 N NaOH. The mixture is extracted with CH$_2$Cl$_2$, and the combined organic extracts are dried over Na$_2$SO$_4$ and evaporated to dryness in a rotary evaporator. For further purification, the crude ester is dissolved in n-heptane and filtered through a silica gel frit. The product is stirred at room temperature for 1 hour in a mixture of 200 ml of ethanol and 50 ml of 1 N NaOH. The mixture is then acidified using conc. HCl, and the product is precipitated by addition of 500 ml of water.

Step 1.4

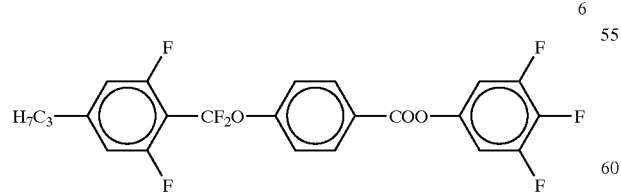

A solution of 50 mmol of 5, 55 mmol of 3,4,5-trifluorophenol, 55 mmol of dicyclohexylcarbodiimide (DCC) and 5 mmol of 4-dimethylaminopyridine (DMAP) in 200 ml of THF is stirred at room temperature for 18 hours and subjected to conventional aqueous work-up. The crude product is chromatographed on silica gel with heptane/ethyl acetate 9:1 and subsequently recrystallized from n-heptane.

The following compounds of the formula

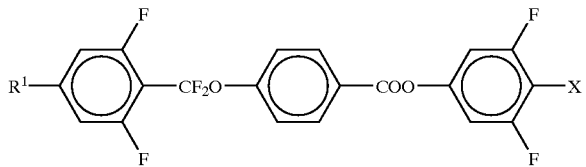

are prepared analogously:

| R$^1$ | X |
|---|---|
| CH$_3$ | F |
| C$_2$H$_5$ | F |
| n-C$_4$H$_9$ | F |
| n-C$_5$H$_{11}$ | F |
| n-C$_6$H$_{13}$ | F |
| n-C$_7$H$_{15}$ | F |
| CH$_2$=CH | F |
| CH$_3$CH=CH | F |
| CH$_2$=CHCH$_2$CH$_2$ | F |
| CH$_3$CH=CHCH$_2$CH$_2$ | F |
| CH$_3$ | OCF$_3$ |
| C$_2$H$_5$ | OCF$_3$ |
| n-C$_3$H$_7$ | OCF$_3$ |
| n-C$_4$H$_9$ | OCF$_3$ |
| n-C$_5$H$_{11}$ | OCF$_3$ |
| n-C$_6$H$_{13}$ | OCF$_3$ |
| n-C$_7$H$_{15}$ | OCF$_3$ |
| CH$_2$=CH | OCF$_3$ |
| CH$_3$CH=CH | OCF$_3$ |
| CH$_2$=CHCH$_2$CH$_2$ | OCF$_3$ |
| CH$_3$CH=CHCH$_2$CH$_2$ | OCF$_3$ |
| CH$_3$ | OCHF$_2$ |
| C$_2$H$_5$ | OCHF$_2$ |
| n-C$_3$H$_7$ | OCHF$_2$ |
| n-C$_4$H$_9$ | OCHF$_2$ |
| n-C$_5$H$_{11}$ | OCHF$_2$ |
| n-C$_6$H$_{13}$ | OCHF$_2$ |
| n-C$_7$H$_{15}$ | OCHF$_2$ |
| CH$_2$=CH | OCHF$_2$ |
| CH$_3$CH=CH | OCHF$_2$ |
| CH$_2$=CHCH$_2$CH$_2$ | OCHF$_2$ |
| CH$_3$CH=CHCH$_2$CH$_2$ | OCHF$_2$ |
| CH$_3$ | CF$_3$ |
| C$_2$H$_5$ | CF$_3$ |
| n-C$_3$H$_7$ | CF$_3$ |
| n-C$_4$H$_9$ | CF$_3$ |
| n-C$_5$H$_{11}$ | CF$_3$ |
| n-C$_6$H$_{13}$ | CF$_3$ |
| n-C$_7$H$_{15}$ | CF$_3$ |
| CH$_2$=CH | CF$_3$ |
| CH$_3$CH=CH | CF$_3$ |
| CH$_2$=CHCH$_2$CH$_2$ | CF$_3$ |
| CH$_3$CH=CHCH$_2$CH$_2$ | CF$_3$ |
| CH$_3$ | OCHFCF$_3$ |
| C$_2$H$_5$ | OCHFCF$_3$ |
| n-C$_3$H$_7$ | OCHFCF$_3$ |
| n-C$_4$H$_9$ | OCHFCF$_3$ |
| n-C$_5$H$_{11}$ | OCHFCF$_3$ |
| n-C$_6$H$_{13}$ | OCHFCF$_3$ |
| n-C$_7$H$_{15}$ | OCHFCF$_3$ |
| CH$_2$=CH | OCHFCF$_3$ |
| CH$_3$CH=CH | OCHFCF$_3$ |
| CH$_2$=CHCH$_2$CH$_2$ | OCHFCF$_3$ |
| CH$_3$CH=CHCH$_2$CH$_2$ | OCHFCF$_3$ |
| CH$_3$ | OCH$_2$CHFCF$_3$ |
| C$_2$H$_5$ | OCH$_2$CHFCF$_3$ |
| n-C$_3$H$_7$ | OCH$_2$CHFCF$_3$ |
| n-C$_4$H$_9$ | OCH$_2$CHFCF$_3$ |
| n-C$_5$H$_{11}$ | OCH$_2$CHFCF$_3$ |
| n-C$_6$H$_{13}$ | OCH$_2$CHFCF$_3$ |
| n-C$_7$H$_{15}$ | OCH$_2$CHFCF$_3$ |

-continued

| R¹ | X |
|---|---|
| CH₂=CH | OCH₂CHFCF₃ |
| CH₃CH=CH | OCH₂CHFCF₃ |
| CH₂=CHCH₂CH₂ | OCH₂CHFCF₃ |
| CH₃CH=CHCH₂CH₂ | OCH₂CHFCF₃ |
| CH₃ | OCF₂CHFCF₃ |
| C₂H₅ | OCF₂CHFCF₃ |
| n-C₃H₇ | OCF₂CHFCF₃ |
| n-C₄H₉ | OCF₂CHFCF₃ |
| n-C₅H₁₁ | OCF₂CHFCF₃ |
| n-C₆H₁₃ | OCF₂CHFCF₃ |
| n-C₇H₁₅ | OCF₂CHFCF₃ |
| CH₂=CH | OCF₂CHFCF₃ |
| CH₃CH=CH | OCF₂CHFCF₃ |
| CH₂=CHCH₂CH₂ | OCF₂CHFCF₃ |
| CH₃CH=CHCH₂CH₂ | OCF₂CHFCF₃ |
| CH₃ | SF₄ |
| C₂H₅ | SF₄ |
| n-C₃H₇ | SF₄ |
| n-C₄H₉ | SF₄ |
| n-C₅H₁₁ | SF₄ |
| n-C₆H₁₃ | SF₄ |
| n-C₇H₁₅ | SF₄ |
| CH₂=CH | SF₄ |
| CH₃CH=CH | SF₄ |
| CH₂=CHCH₂CH₂ | SF₄ |
| CH₃CH=CHCH₂CH₂ | SF₄ |
| CH₃ | CN |
| C₂H₅ | CN |
| n-C₃H₇ | CN |
| n-C₄H₉ | CN |
| n-C₅H₁₁ | CN |
| n-C₆H₁₃ | CN |
| n-C₇H₁₅ | CN |
| CH₂=CH | CN |
| CH₃CH=CH | CN |
| CH₂=CHCH₂CH₂ | CN |
| CH₃CH=CHCH₂CH₂ | CN |

Example 2

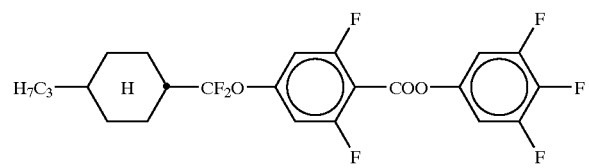

Step 2.1

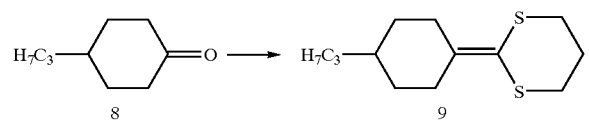

2.858 mol of 2-trimethylsilyl-1,3-dithiane are initially introduced in 1.5 l of abs. THF, and 2.868 mol of BuLi (15% solution) are added dropwise at −70° C. over the course of 0.5 hour. The mixture is slowly allowed to warm to room temperature, and 2.852 mol of 8 in 1 l of abs. THF are added dropwise at −70° C. The reaction mixture is stirred overnight at room temperature, poured onto ice and extracted with methyl tert-butyl ether. The combined organic phases are washed with saturated sodium chloride solution, dried using sodium sulfate, filtered and evaporated. The residue is distilled under reduced pressure.

b.p. 150–160° C. (1 mbar)

Step 2.2

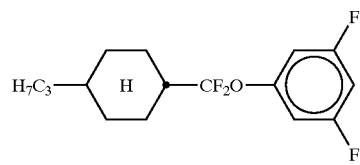

10

0.325 mol of 9 is dissolved in 400 ml of dichloromethane, and 0.330 mol of trifluoromethanesulfonic acid is added dropwise with ice cooling. After 15 minutes, the cooling is removed, and the mixture is stirred at room temperature for 0.5 hour. The mixture is subsequently cooled to 70° C., and a mixture of 0.575 mol of triethylamine and 0.490 mol of 3,5-difluorophenol in 200 ml of dichloromethane is added, and the mixture is stirred at −70° C. for 1 hour. 1.613 mol of triethylamine hydrofluoride are then added, and, after 5 minutes, 1.609 mol of 1,3-dibromo-5,5-dimethylhydantoin suspended in 200 ml of dichloromethane are slowly added. The reaction mixture is stirred for 1 hour and allowed to warm to −20° C., and the orange solution is added with stirring to a mixture of ice and 500 ml of sodium hydroxide solution. The organic phases are separated off, and the aqueous phase is extracted with dichloromethane. Finally, the mixture is subjected to conventional work-up. The product is fritted over silica gel (n-heptane/ethyl acetate 10:1). Finally, the eluate is evaporated.

Step 2.3

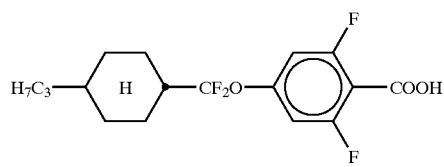

11

0.19 mol of butyllithium (15% solution) is added to 0.106 mol of 10 in 500 ml of abs. THF at −70° C. in a nitrogen atmosphere. When the addition is complete, the reaction mixture is stirred for 1 hour and poured onto dry ice. The reaction mixture is allowed to warm to 0° C., 50 ml of water are added, and the mixture is acidified using 25 ml of conc. hydrochloric acid. After addition of 50 ml of methyl tert-butyl ether, the aqueous phase is separated off and extracted with methyl tert-butyl ether. The combined organic phases are subjected to conventional work-up. The product is recrystallized from n-heptane/toluene 2:1.

Step 2.4

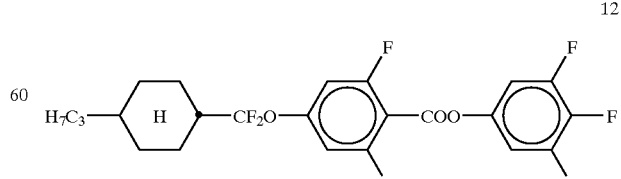

12

18.66 mol of 11 and 18.91 mmol of 3,4,5-trifluorophenol in 120 ml of dichloromethane are cooled to 5° C. After addition of N,N'-dicyclohexylcarbodiimide in 30 ml of dichloromethane, the mixture is stirred overnight at room temperature. After addition of 3.174 mmol of oxalic acid dihydrate, the mixture is stirred for a further 1 hour. The sediment is filtered off with suction, and the solution is evaporated. The residue is dissolved in n-heptane/methyl tert-butyl ether and filtered through a silica gel column. The eluate is evaporated, and the residue is recrystallized from n-heptane. C 61 N 71.6 I; $\Delta n=0.0870$; $\Delta\epsilon=24.5$ The following compounds of the formula

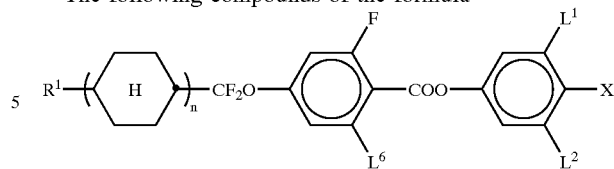

are prepared analogously:

| $R^1$ | n | X | $L^1$ | $L^2$ | $L^6$ | |
|---|---|---|---|---|---|---|
| $CH_3$ | 1 | F | F | F | F | |
| $C_2H_5$ | 1 | F | F | F | F | |
| n-$C_4H_9$ | 1 | F | F | F | F | |
| n-$C_5H_{11}$ | 1 | F | F | F | F | |
| n-$C_6H_{13}$ | 1 | F | F | F | F | |
| n-$C_7H_{15}$ | 1 | F | F | F | F | |
| $CH_2$=CH | 1 | F | F | F | F | |
| $CH_3CH$=CH | 1 | F | F | F | F | |
| $CH_2$=CHCH$_2$CH$_2$ | 1 | F | F | F | F | |
| $CH_3$—CH=CHCH$_2$CH$_2$ | 1 | F | F | F | F | |
| $CH_3$ | 1 | $OCF_3$ | F | F | F | |
| $C_2H_5$ | 1 | $OCF_3$ | F | F | F | |
| n-$C_3H_7$ | 1 | $OCF_3$ | F | F | F | |
| n-$C_4H_9$ | 1 | $OCF_3$ | F | F | F | |
| n-$C_5H_{11}$ | 1 | $OCF_3$ | F | F | F | |
| n-$C_6H_{13}$ | 1 | $OCF_3$ | F | F | F | |
| n-$C_7H_{15}$ | 1 | $OCF_3$ | F | F | F | |
| $CH_2$=CH | 1 | $OCF_3$ | F | F | F | |
| $CH_3CH$=CH | 1 | $OCF_3$ | F | F | F | |
| $CH_2$=CHCH$_2$CH$_2$ | 1 | $OCF_3$ | F | F | F | |
| $CH_3$—CH=CHCH$_2$CH$_2$ | 1 | $OCF_3$ | F | F | F | |
| $CH_3$ | 1 | $OCHF_2$ | F | F | F | |
| $C_2H_5$ | 1 | $OCHF_2$ | F | F | F | |
| n-$C_3H_7$ | 1 | $OCHF_2$ | F | F | F | |
| n-$C_4H_9$ | 1 | $OCHF_2$ | F | F | F | |
| n-$C_5H_{11}$ | 1 | $OCHF_2$ | F | F | F | |
| n-$C_6H_{13}$ | 1 | $OCHF_2$ | F | F | F | |
| n-$C_7H_{15}$ | 1 | $OCHF_2$ | F | F | F | |
| $CH_2$=CH | 1 | $OCHF_2$ | F | F | F | |
| $CH_3CH$=CH | 1 | $OCHF_2$ | F | F | F | |
| $CH_2$=CHCH$_2$CH$_2$ | 1 | $OCHF_2$ | F | F | F | |
| $CH_3$—CH=CHCH$_2$CH$_2$ | 1 | $OCHF_2$ | F | F | F | |
| $CH_3$ | 1 | $OC_2F_5$ | F | F | F | |
| $C_2H_5$ | 1 | $OC_2F_5$ | F | F | F | |
| n-$C_3H_7$ | 1 | $OC_2F_5$ | F | F | F | |
| n-$C_4H_9$ | 1 | $OC_2F_5$ | F | F | F | |
| n-$C_5H_{11}$ | 1 | $OC_2F_5$ | F | F | F | |
| n-$C_6H_{13}$ | 1 | $OC_2F_5$ | F | F | F | |
| n-$C_7H_{15}$ | 1 | $OC_2F_5$ | F | F | F | |
| $CH_2$=CH | 1 | $OC_2F_5$ | F | F | F | |
| $CH_3CH$=CH | 1 | $OC_2F_5$ | F | F | F | |
| $CH_2$=CHCH$_2$CH$_2$ | 1 | $OC_2F_5$ | F | F | F | |
| $CH_3$—CH=CHCH$_2$CH$_2$ | 1 | $OC_2F_5$ | F | F | F | |
| $CH_3$ | 1 | $OCH_2CF_2CF_3$ | F | F | F | |
| $C_2H_5$ | 1 | $OCH_2CF_2CF_3$ | F | F | F | |
| n-$C_3H_7$ | 1 | $OCH_2CF_2CF_3$ | F | F | F | |
| n-$C_4H_9$ | 1 | $OCH_2CF_2CF_3$ | F | F | F | |
| n-$C_5H_{11}$ | 1 | $OCH_2CF_2CF_3$ | F | F | F | |
| n-$C_6H_{13}$ | 1 | $OCH_2CF_2CF_3$ | F | F | F | |
| n-$C_7H_{15}$ | 1 | $OCH_2CF_2CF_3$ | F | F | F | |
| $CH_2$=CH | 1 | $OCH_2CF_2CF_3$ | F | F | F | |
| $CH_3CH$=CH | 1 | $OCH_2CF_2CF_3$ | F | F | F | |
| $CH_2$=CHCH$_2$CH$_2$ | 1 | $OCH_2CF_2CF_3$ | F | F | F | |
| $CH_3$—CH=CHCH$_2$CH$_2$ | 1 | $OCH_2CF_2CF_3$ | F | F | F | |
| $CH_3$ | 1 | F | F | H | F | |
| $C_2H_5$ | 1 | F | F | H | F | |
| n-$C_3H_7$ | 1 | F | F | H | F | C 62 N 92.7 I; $\Delta\epsilon = 18.9$; $\Delta n = 0.1040$ |
| n-$C_4H_9$ | 1 | F | F | H | F | |
| n-$C_5H_{11}$ | 1 | F | F | H | F | |
| n-$C_6H_{13}$ | 1 | F | F | H | F | |
| n-$C_7H_{15}$ | 1 | F | F | H | F | |
| $CH_2$=CH | 1 | F | F | H | F | |
| $CH_3CH$=CH | 1 | F | F | H | F | |
| $CH_2$=CHCH$_2$CH$_2$ | 1 | F | F | H | F | |

-continued

| R¹ | n | X | L¹ | L² | L⁶ | |
|---|---|---|---|---|---|---|
| CH₃—CH=CHCH₂CH₂ | 1 | F | F | H | F | |
| CH₃ | 1 | OCF₃ | F | H | F | |
| C₂H₅ | 1 | OCF₃ | F | H | F | |
| n-C₃H₇ | 1 | OCF₃ | F | H | F | C 53 S$_A$ (42) N 110.9 I; $\Delta\epsilon$ = 21.5; $\Delta$n = 0.1030 |
| n-C₄H₉ | 1 | OCF₃ | F | H | F | |
| n-C₅H₁₁ | 1 | OCF₃ | F | H | F | |
| n-C₆H₁₃ | 1 | OCF₃ | F | H | F | |
| n-C₇H₁₅ | 1 | OCF₃ | F | H | F | |
| CH₂=CH | 1 | OCF₃ | F | H | F | |
| CH₃CH=CH | 1 | OCF₃ | F | H | F | |
| CH₂=CHCH₂CH₂ | 1 | OCF₃ | F | H | F | |
| CH₃—CH=CHCH₂CH₂ | 1 | OCF₃ | F | H | F | |
| CH₃ | 1 | OCHF₂ | F | H | F | |
| C₂H₅ | 1 | OCHF₂ | F | H | F | |
| n-C₃H₇ | 1 | OCHF₂ | F | H | F | |
| n-C₄H₉ | 1 | OCHF₂ | F | H | F | |
| n-C₅H₁₁ | 1 | OCHF₂ | F | H | F | |
| n-C₆H₁₃ | 1 | OCHF₂ | F | H | F | |
| n-C₇H₁₅ | 1 | OCHF₂ | F | H | F | |
| CH₂=CH | 1 | OCHF₂ | F | H | F | |
| CH₃CH=CH | 1 | OCHF₂ | F | H | F | |
| CH₂=CHCH₂CH₂ | 1 | OCHF₂ | F | H | F | |
| CH₃—CH=CHCH₂CH₂ | 1 | OCHF₂ | F | H | F | |
| CH₃ | 1 | OC₂F₅ | F | H | F | |
| C₂H₅ | 1 | OC₂F₅ | F | H | F | |
| n-C₃H₇ | 1 | OC₂F₅ | F | H | F | |
| n-C₄H₉ | 1 | OC₂F₅ | F | H | F | |
| n-C₅H₁₁ | 1 | OC₂F₅ | F | H | F | |
| n-C₆H₁₃ | 1 | OC₂F₅ | F | H | F | |
| n-C₇H₁₅ | 1 | OC₂F₅ | F | H | F | |
| CH₂=CH | 1 | OC₂F₅ | F | H | F | |
| CH₃CH=CH | 1 | OC₂F₅ | F | H | F | |
| CH₂=CHCH₂CH₂ | 1 | OC₂F₅ | F | H | F | |
| CH₃—CH=CHCH₂CH₂ | 1 | OC₂F₅ | F | H | F | |
| CH₃ | 1 | OCH₂CF₂CF₃ | F | H | F | |
| C₂H₅ | 1 | OCH₂CF₂CF₃ | F | H | F | |
| n-C₃H₇ | 1 | OCH₂CF₂CF₃ | F | H | F | |
| n-C₄H₉ | 1 | OCH₂CF₂CF₃ | F | H | F | |
| n-C₅H₁₁ | 1 | OCH₂CF₂CF₃ | F | H | F | |
| n-C₆H₁₃ | 1 | OCH₂CF₂CF₃ | F | H | F | |
| n-C₇H₁₅ | 1 | OCH₂CF₂CF₃ | F | H | F | |
| CH₂=CH | 1 | OCH₂CF₂CF₃ | F | H | F | |
| CH₃CH=CH | 1 | OCH₂CF₂CF₃ | F | H | F | |
| CH₂=CHCH₂CH₂ | 1 | OCH₂CF₂CF₃ | F | H | F | |
| CH₃—CH=CHCH₂CH₂ | 1 | OCH₂CF₂CF₃ | F | H | F | |
| CH₃ | 1 | F | H | H | F | |
| C₂H₅ | 1 | F | H | H | F | |
| n-C₃H₇ | 1 | F | H | H | F | |
| n-C₄H₉ | 1 | F | H | H | F | |
| n-C₅H₁₁ | 1 | F | H | H | F | |
| n-C₆H₁₃ | 1 | F | H | H | F | |
| n-C₇H₁₅ | 1 | F | H | H | F | |
| CH₂=CH | 1 | F | H | H | F | |
| CH₃CH=CH | 1 | F | H | H | F | |
| CH₂=CHCH₂CH₂ | 1 | F | H | H | F | |
| CH₃—CH=CHCH₂CH₂ | 1 | F | H | H | F | |
| CH₃ | 1 | OCF₃ | H | H | F | |
| C₂H₅ | 1 | OCF₃ | H | H | F | |
| n-C₃H₇ | 1 | OCF₃ | H | H | F | C 47 S$_A$ 51 N 127.2 I; $\Delta\epsilon$ = 17.8; $\Delta$n = 0.1090 |
| n-C₄H₉ | 1 | OCF₃ | H | H | F | |
| n-C₅H₁₁ | 1 | OCF₃ | H | H | F | |
| n-C₆H₁₃ | 1 | OCF₃ | H | H | F | |
| n-C₇H₁₅ | 1 | OCF₃ | H | H | F | |
| CH₂=CH | 1 | OCF₃ | H | H | F | |
| CH₃CH=CH | 1 | OCF₃ | H | H | F | |
| CH₂=CHCH₂CH₂ | 1 | OCF₃ | H | H | F | |
| CH₃—CH=CHCH₂CH₂ | 1 | OCF₃ | H | H | F | |
| CH₃ | 1 | OCHF₂ | H | H | F | |
| C₂H₅ | 1 | OCHF₂ | H | H | F | |
| n-C₃H₇ | 1 | OCHF₂ | H | H | F | |
| n-C₄H₉ | 1 | OCHF₂ | H | H | F | |
| n-C₅H₁₁ | 1 | OCHF₂ | H | H | F | |
| n-C₆H₁₃ | 1 | OCHF₂ | H | H | F | |
| n-C₇H₁₅ | 1 | OCHF₂ | H | H | F | |
| CH₂=CH | 1 | OCHF₂ | H | H | F | |

-continued

| R¹ | n | X | L¹ | L² | L⁶ | |
|---|---|---|---|---|---|---|
| CH₃CH=CH | 1 | OCHF₂ | H | H | F | |
| CH₂=CHCH₂CH₂ | 1 | OCHF₂ | H | H | F | |
| CH₃—CH=CHCH₂CH₂ | 1 | OCHF₂ | H | H | F | |
| CH₃ | 1 | OC₂F₅ | H | H | F | |
| C₂H₅ | 1 | OC₂F₅ | H | H | F | |
| n-C₃H₇ | 1 | OC₂F₅ | H | H | F | |
| n-C₄H₉ | 1 | OC₂F₅ | H | H | F | |
| n-C₅H₁₁ | 1 | OC₂F₅ | H | H | F | |
| n-C₆H₁₃ | 1 | OC₂F₅ | H | H | F | |
| n-C₇H₁₅ | 1 | OC₂F₅ | H | H | F | |
| CH₂=CH | 1 | OC₂F₅ | H | H | F | |
| CH₃CH=CH | 1 | OC₂F₅ | H | H | F | |
| CH₂=CHCH₂CH₂ | 1 | OC₂F₅ | H | H | F | |
| CH₃—CH=CHCH₂CH₂ | 1 | OC₂F₅ | H | H | F | |
| CH₃ | 1 | OCH₂CF₂CF₃ | H | H | F | |
| C₂H₅ | 1 | OCH₂CF₂CF₃ | H | H | F | |
| n-C₃H₇ | 1 | OCH₂CF₂CF₃ | H | H | F | |
| n-C₄H₉ | 1 | OCH₂CF₂CF₃ | H | H | F | |
| n-C₅H₁₁ | 1 | OCH₂CF₂CF₃ | H | H | F | |
| n-C₆H₁₃ | 1 | OCH₂CF₂CF₃ | H | H | F | |
| n-C₇H₁₅ | 1 | OCH₂CF₂CF₃ | H | H | F | |
| CH₂=CH | 1 | OCH₂CF₂CF₃ | H | H | F | |
| CH₃CH=CH | 1 | OCH₂CF₂CF₃ | H | H | F | |
| CH₂=CHCH₂CH₂ | 1 | OCH₂CF₂CF₃ | H | H | F | |
| CH₃—CH=CHCH₂CH₂ | 1 | OCH₂CF₂CF₃ | H | H | F | |
| CH₃ | 2 | F | F | F | F | |
| C₂H₅ | 2 | F | F | F | F | |
| n-C₃H₇ | 2 | F | F | F | F | C 95 N 223.2 I; Δε 24.8; Δn = 0.1060 |
| n-C₄H₉ | 2 | F | F | F | F | |
| n-C₃H₇ | 2 | F | F | F | F | |
| n-C₅H₁₁ | 2 | F | F | F | F | |
| n-C₆H₁₃ | 2 | F | F | F | F | |
| n-C₇H₁₅ | 2 | F | F | F | F | |
| CH₂=CH | 2 | F | F | F | F | |
| CH₃CH=CH | 2 | F | F | F | F | |
| CH₂=CHCH₂CH₂ | 2 | F | F | F | F | |
| CH₃—CH=CHCH₂CH₂ | 2 | F | F | F | F | |
| CH₃ | 2 | OCF₃ | F | F | F | |
| C₂H₅ | 2 | OCF₃ | F | F | F | |
| n-C₃H₇ | 2 | OCF₃ | F | F | F | |
| n-C₄H₉ | 2 | OCF₃ | F | F | F | |
| n-C₅H₁₁ | 2 | OCF₃ | F | F | F | |
| n-C₆H₁₃ | 2 | OCF₃ | F | F | F | |
| n-C₇H₁₅ | 2 | OCF₃ | F | F | F | |
| CH₂=CH | 2 | OCF₃ | F | F | F | |
| CH₃CH=CH | 2 | OCF₃ | F | F | F | |
| CH₂=CHCH₂CH₂ | 2 | OCF₃ | F | F | F | |
| CH₃—CH=CHCH₂CH₂ | 2 | OCF₃ | F | F | F | |
| CH₃ | 2 | OCHF₂ | F | F | F | |
| C₂H₅ | 2 | OCHF₂ | F | F | F | |
| n-C₃H₇ | 2 | OCHF₂ | F | F | F | |
| n-C₄H₉ | 2 | OCHF₂ | F | F | F | |
| n-C₅H₁₁ | 2 | OCHF₂ | F | F | F | |
| n-C₆H₁₃ | 2 | OCHF₂ | F | F | F | |
| n-C₇H₁₅ | 2 | OCHF₂ | F | F | F | |
| CH₂=CH | 2 | OCHF₂ | F | F | F | |
| CH₃CH=CH | 2 | OCHF₂ | F | F | F | |
| CH₂=CHCH₂CH₂ | 2 | OCHF₂ | F | F | F | |
| CH₃—CH=CHCH₂CH₂ | 2 | OCHF₂ | F | F | F | |
| CH₃ | 2 | OC₂F₅ | F | F | F | |
| C₂H₅ | 2 | OC₂F₅ | F | F | F | |
| n-C₃H₇ | 2 | OC₂F₅ | F | F | F | |
| n-C₄H₉ | 2 | OC₂F₅ | F | F | F | |
| n-C₅H₁₁ | 2 | OC₂F₅ | F | F | F | |
| n-C₆H₁₃ | 2 | OC₂F₅ | F | F | F | |
| n-C₇H₁₅ | 2 | OC₂F₅ | F | F | F | |
| CH₂=CH | 2 | OC₂F₅ | F | F | F | |
| CH₃CH=CH | 2 | OC₂F₅ | F | F | F | |
| CH₂=CHCH₂CH₂ | 2 | OC₂F₅ | F | F | F | |
| CH₃—CH=CHCH₂CH₂ | 2 | OC₂F₅ | F | F | F | |
| CH₃ | 2 | OCH₂CF₂CF₃ | F | F | F | |
| C₂H₅ | 2 | OCH₂CF₂CF₃ | F | F | F | |
| n-C₃H₇ | 2 | OCH₂CF₂CF₃ | F | F | F | |
| n-C₄H₉ | 2 | OCH₂CF₂CF₃ | F | F | F | |
| n-C₅H₁₁ | 2 | OCH₂CF₂CF₃ | F | F | F | |
| n-C₆H₁₃ | 2 | OCH₂CF₂CF₃ | F | F | F | |

-continued

| R$^1$ | n | X | L$^1$ | L$^2$ | L$^6$ | |
|---|---|---|---|---|---|---|
| n-C$_7$H$_{15}$ | 2 | OCH$_2$CF$_2$CF$_3$ | F | F | F | |
| CH$_2$=CH | 2 | OCH$_2$CF$_2$CF$_3$ | F | F | F | |
| CH$_3$CH=CH | 2 | OCH$_2$CF$_2$CF$_3$ | F | F | F | |
| CH$_2$=CHCH$_2$CH$_2$ | 2 | OCH$_2$CF$_2$CF$_3$ | F | F | F | |
| CH$_3$—CH=CHCH$_2$CH$_2$ | 2 | OCH$_2$CF$_2$CF$_3$ | F | F | F | |
| CH$_3$ | 2 | F | F | H | F | |
| C$_2$H$_5$ | 2 | F | F | H | F | |
| n-C$_3$H$_7$ | 2 | F | F | H | F | C 90 N 236.4 I; Δε = 18.2; Δn = 0.1210 |
| n-C$_4$H$_9$ | 2 | F | F | H | F | |
| n-C$_5$H$_{11}$ | 2 | F | F | H | F | |
| n-C$_6$H$_{13}$ | 2 | F | F | H | F | |
| n-C$_7$H$_{15}$ | 2 | F | F | H | F | |
| CH$_2$=CH | 2 | F | F | H | F | |
| CH$_3$CH=CH | 2 | F | F | H | F | |
| CH$_2$=CHCH$_2$CH$_2$ | 2 | F | F | H | F | |
| CH$_3$—CH=CHCH$_2$CH$_2$ | 2 | F | F | H | F | |
| CH$_3$ | 2 | OCF$_3$ | F | H | F | |
| C$_2$H$_5$ | 2 | OCF$_3$ | F | H | F | |
| n-C$_3$H$_7$ | 2 | OCF$_3$ | F | H | F | C 72 N 244.7 I; Δε = 21.0; Δn = 0.1214 |
| n-C$_4$H$_9$ | 2 | OCF$_3$ | F | H | F | |
| n-C$_5$H$_{11}$ | 2 | OCF$_3$ | F | H | F | |
| n-C$_6$H$_{13}$ | 2 | OCF$_3$ | F | H | F | |
| n-C$_7$H$_{15}$ | 2 | OCF$_3$ | F | H | F | |
| CH$_2$=CH | 2 | OCF$_3$ | F | H | F | |
| CH$_3$CH=CH | 2 | OCF$_3$ | F | H | F | |
| CH$_2$=CHCH$_2$CH$_2$ | 2 | OCF$_3$ | F | H | F | |
| CH$_3$—CH=CHCH$_2$CH$_2$ | 2 | OCF$_3$ | F | H | F | |
| CH$_3$ | 2 | OCHF$_2$ | F | H | F | |
| C$_2$H$_5$ | 2 | OCHF$_2$ | F | H | F | |
| n-C$_3$H$_7$ | 2 | OCHF$_2$ | F | H | F | |
| n-C$_4$H$_9$ | 2 | OCHF$_2$ | F | H | F | |
| n-C$_5$H$_{11}$ | 2 | OCHF$_2$ | F | H | F | |
| n-C$_6$H$_{13}$ | 2 | OCHF$_2$ | F | H | F | |
| n-C$_7$H$_{15}$ | 2 | OCHF$_2$ | F | H | F | |
| CH$_2$=CH | 2 | OCHF$_2$ | F | H | F | |
| CH$_3$CH=CH | 2 | OCHF$_2$ | F | H | F | |
| CH$_2$=CHCH$_2$CH$_2$ | 2 | OCHF$_2$ | F | H | F | |
| CH$_3$—CH=CHCH$_2$CH$_2$ | 2 | OCHF$_2$ | F | H | F | |
| CH$_3$ | 2 | OC$_2$F$_5$ | F | H | F | |
| C$_2$H$_5$ | 2 | OC$_2$F$_5$ | F | H | F | |
| n-C$_3$H$_7$ | 2 | OC$_2$F$_5$ | F | H | F | |
| n-C$_4$H$_9$ | 2 | OC$_2$F$_5$ | F | H | F | |
| n-C$_5$H$_{11}$ | 2 | OC$_2$F$_5$ | F | H | F | |
| n-C$_6$H$_{13}$ | 2 | OC$_2$F$_5$ | F | H | F | |
| n-C$_7$H$_{15}$ | 2 | OC$_2$F$_5$ | F | H | F | |
| CH$_2$=CH | 2 | OC$_2$F$_5$ | F | H | F | |
| CH$_3$CH$_2$=CH | 2 | OC$_2$F$_5$ | F | H | F | |
| CH$_2$=CHCH$_2$CH$_2$ | 2 | OC$_2$F$_5$ | F | H | F | |
| CH$_3$—CH=CHCH$_2$CH$_2$ | 2 | OC$_2$F$_5$ | F | H | F | |
| CH$_3$ | 2 | OCH$_2$CF$_2$CF$_3$ | F | H | F | |
| C$_2$H$_5$ | 2 | OCH$_2$CF$_2$CF$_3$ | F | H | F | |
| n-C$_3$H$_7$ | 2 | OCH$_2$CF$_2$CF$_3$ | F | H | F | |
| n-C$_4$H$_9$ | 2 | OCH$_2$CF$_2$CF$_3$ | F | H | F | |
| n-C$_5$H$_{11}$ | 2 | OCH$_2$CF$_2$CF$_3$ | F | H | F | |
| n-C$_6$H$_{13}$ | 2 | OCH$_2$CF$_2$CF$_3$ | F | H | F | |
| n-C$_7$H$_{15}$ | 2 | OCH$_2$CF$_2$CF$_3$ | F | H | F | |
| CH$_2$=CH | 2 | OCH$_2$CF$_2$CF$_3$ | F | H | F | |
| CH$_3$CH=CH | 2 | OCH$_2$CF$_2$CF$_3$ | F | H | F | |
| CH$_2$=CHCH$_2$CH$_2$ | 2 | OCH$_2$CF$_2$CF$_3$ | F | H | F | |
| CH$_3$—CH=CHCH$_2$CH$_2$ | 2 | OCH$_2$CF$_2$CF$_3$ | F | H | F | |
| CH$_3$ | 2 | F | H | H | F | |
| C$_2$H$_5$ | 2 | F | H | H | F | |
| n-C$_3$H$_7$ | 2 | F | H | H | F | |
| n-C$_4$H$_9$ | 2 | F | H | H | F | |
| n-C$_5$H$_{11}$ | 2 | F | H | H | F | |
| n-C$_6$H$_{13}$ | 2 | F | H | H | F | |
| n-C$_7$H$_{15}$ | 2 | F | H | H | F | |
| CH$_2$=CH | 2 | F | H | H | F | |
| CH$_3$CH=CH | 2 | F | H | H | F | |
| CH$_2$=CHCH$_2$CH$_2$ | 2 | F | H | H | F | |
| CH$_3$—CH=CHCH$_2$CH$_2$ | 2 | F | H | H | F | |
| CH$_3$ | 2 | OCF$_3$ | H | H | F | |
| C$_2$H$_5$ | 2 | OCF$_3$ | H | H | F | |
| n-C$_3$H$_7$ | 2 | OCF$_3$ | H | H | F | C 67 S$_A$ 89 N 254.0 I; Δε = 17.0; Δn = 0.1300 |

-continued

| R¹ | n | X | L¹ | L² | L⁶ |
|---|---|---|---|---|---|
| n-C₄H₉ | 2 | OCF₃ | H | H | F |
| n-C₅H₁₁ | 2 | OCF₃ | H | H | F |
| n-C₆H₁₃ | 2 | OCF₃ | H | H | F |
| n-C₇H₁₅ | 2 | OCF₃ | H | H | F |
| CH₂=CH | 2 | OCF₃ | H | H | F |
| CH₃CH=CH | 2 | OCF₃ | H | H | F |
| CH₂=CHCH₂CH₂ | 2 | OCF₃ | H | H | F |
| CH₃—CH=CHCH₂CH₂ | 2 | OCF₃ | H | H | F |
| CH₃ | 2 | OCHF₂ | H | H | F |
| C₂H₅ | 2 | OCHF₂ | H | H | F |
| n-C₃H₇ | 2 | OCHF₂ | H | H | F |
| n-C₄H₉ | 2 | OCHF₂ | H | H | F |
| n-C₅H₁₁ | 2 | OCHF₂ | H | H | F |
| n-C₆H₁₃ | 2 | OCHF₂ | H | H | F |
| n-C₇H₁₅ | 2 | OCHF₂ | H | H | F |
| CH₂=CH | 2 | OCHF₂ | H | H | F |
| CH₃CH=CH | 2 | OCHF₂ | H | H | F |
| CH₂=CHCH₂CH₂ | 2 | OCHF₂ | H | H | F |
| CH₃—CH=CHCH₂CH₂ | 2 | OCHF₂ | H | H | F |
| CH₃ | 2 | OC₂F₅ | H | H | F |
| C₂H₅ | 2 | OC₂F₅ | H | H | F |
| n-C₃H₇ | 2 | OC₂F₅ | H | H | F |
| n-C₄H₉ | 2 | OC₂F₅ | H | H | F |
| n-C₅H₁₁ | 2 | OC₂F₅ | H | H | F |
| n-C₆H₁₃ | 2 | OC₂F₅ | H | H | F |
| n-C₇H₁₅ | 2 | OC₂F₅ | H | H | F |
| CH₂=CH | 2 | OC₂F₅ | H | H | F |
| CH₃CH=CH | 2 | OC₂F₅ | H | H | F |
| CH₂=CHCH₂CH₂ | 2 | OC₂F₅ | H | H | F |
| CH₃—CH=CHCH₂CH₂ | 2 | OC₂F₅ | H | H | F |
| CH₃ | 2 | OCH₂CF₂CF₃ | H | H | F |
| C₂H₅ | 2 | OCH₂CF₂CF₃ | H | H | F |
| n-C₃H₇ | 2 | OCH₂CF₂CF₃ | H | H | F |
| n-C₄H₉ | 2 | OCH₂CF₂CF₃ | H | H | F |
| n-C₅H₁₁ | 2 | OCH₂CF₂CF₃ | H | H | F |
| n-C₆H₁₃ | 2 | OCH₂CF₂CF₃ | H | H | F |
| n-C₇H₁₅ | 2 | OCH₂CF₂CF₃ | H | H | F |
| CH₂=CH | 2 | OCH₂CF₂CF₃ | H | H | F |
| CH₃CH=CH | 2 | OCH₂CF₂CF₃ | H | H | F |
| CH₂=CHCH₂CH₂ | 2 | OCH₂CF₂CF₃ | H | H | F |
| CH₃—CH=CHCH₂CH₂ | 2 | OCH₂CF₂CF₃ | H | H | F |

MIXTURE EXAMPLES

Example M1

| | | | |
|---|---|---|---|
| CCP-30CF₃ | 8.00% | Clearing point [° C.]: | 89 |
| CCP-50CF₃ | 8.00% | Δn [589 nm, 20° C.]: | 0.0902 |
| CCP-20CF₃.F | 12.00% | Δε [1 kHz, 20° C.]: | 10.5 |
| CCP-30CF₃.F | 12.00% | γ₁ [mPa·s, 20° C.]: | 171 |
| CCP-50CF₃.F | 6.50% | | |
| CCP-3F.F.F | 10.00% | | |
| CCP-5F.F.F | 2.00% | | |
| CGU-2-F | 10.00% | | |
| CGU-3-F | 10.00% | | |
| CBC-33F | 4.00% | | |
| CCP-1F.F.F | 11.00% | | |
| CQUZU-3-F | 6.50% | | |

Example M2

| | | | |
|---|---|---|---|
| CCP-2F.F.F | 6.00% | Clearing point [° C.]: | 83.5 |
| CCP-20CF₃.F | 12.00% | Δn [589 nm, 20° C.]: | 0.0881 |
| CCP-30CF₃.F | 8.50% | Δε [1 kHz, 20° C.]: | 10.9 |
| CCP-20CF₃ | 8.00% | γ₁ [mPa·s, 20° C.]: | 153 |
| CCP-30CF₃ | 8.00% | | |
| CCP-40CF₃ | 6.00% | | |
| CCP-50CF₃ | 7.00% | | |
| CGU-2-F | 10.00% | | |
| CGU-3-F | 2.50% | | |
| CCG-V-F | 12.00% | | |
| CCP-1F.F.F | 10.00% | | |
| CQUZU-3-F | 10.00% | | |

Example M3

| | | | |
|---|---|---|---|
| CCP-20CF₃ | 6.00% | S → N: | −30.0° C. |
| CCP-30CF₃ | 5.00% | Clearing point [° C.]: | 80.0 |
| CCP-2F.F.F | 10.00% | Δn [589 nm, 20° C.]: | 0.1036 |
| CCP-3F.F.F | 11.00% | γ₁ [mPa·s, 20° C.]: | 109 |
| BCH-3F.F.F | 7.00% | d·Δn [μm, 20° C.]: | 0.50 |
| PGU-2-F | 8.00% | Twist [°]: | 90 |
| PGU-3-F | 4.00% | V₁₀: | 1.29 |
| PGU-5-F | 3.00% | | |
| CCZU-3-F | 14.00% | | |
| BCH-32 | 5.00% | | |
| CCH-35 | 5.00% | | |
| CC-3-V1 | 13.00% | | |
| CQUZU-3-F | 5.00% | | |
| PCH-302 | 4.00% | | |

Example M4

| | | | |
|---|---|---|---|
| BCH-3F.F | 10.80% | Clearing point [° C.]: | +88.1 |
| BCH-5F.F | 9.00% | Δn [589 nm, 20° C.]: | +0.0960 |
| ECCP-30CF₃ | 4.50% | Δε [1 kHz, 20° C.]: | +7.3 |
| ECCP-50CF₃ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF₃ | 7.20% | | |
| CCP-30CF₃ | 10.80% | | |

-continued

| | |
|---|---|
| CCP-40CF₃ | 6.30% |
| CCP-50CF₃ | 9.90% |
| PCH-5F | 9.00% |
| CQUZU-3-F | 10.00% |

Example M5

| | | | |
|---|---|---|---|
| BCH-3F.F | 10.80% | Clearing point [° C.]: | +101.0 |
| BCH-5F.F | 9.00% | Δn [589 nm, 20° C.]: | +0.0979 |
| ECCP-30CF₃ | 4.50% | Δε [1 kHz, 20° C.]: | +7.3 |
| ECCP-50CF₃ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF₃ | 7.20% | | |
| CCP-30CF₃ | 10.80% | | |
| CCP-40CF₃ | 6.30% | | |
| CCP-50CF₃ | 9.90% | | |
| PCH-5F | 9.00% | | |
| CCQUZU-3-F | 10.00% | | |

Example M6

| | | | |
|---|---|---|---|
| CCH-301 | 11.20% | Clearing point [° C.]: | +75.0 |
| CCH-3CF₃ | 6.40% | Δn [589 nm, 20° C.]: | +0.0665 |
| CCH-501 | 8.80% | | |
| CCP-2F.F.F | 8.00% | | |
| CCP-3F.F.F | 10.40% | | |
| CCP-5F.F.F | 4.00% | | |
| CCPC-33 | 2.40% | | |
| CCZU-2-F | 4.00% | | |
| CCZU-3-F | 13.60% | | |
| CCZU-5-F | 4.00% | | |
| CH-33 | 2.40% | | |
| CH-35 | 2.40% | | |
| CH-43 | 2.40% | | |
| CQUZU-3-F | 20.00% | | |

Example M7

| | | | |
|---|---|---|---|
| BCH-3F.F | 10.80% | Clearing point [° C.]: | +102.7 |
| BCH-5F.F | 9.00% | Δn [589 nm, 20° C.]: | +0.0994 |
| ECCP-30CF₃ | 4.50% | Δε [1 kHz, 20° C.]: | +6.9 |
| ECCP-50CF₃ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF₃ | 7.20% | | |
| CCP-30CF₃ | 10.80% | | |
| CCP-40CF₃ | 6.30% | | |
| CCP-50CF₃ | 9.90% | | |
| PCH-5F | 9.00% | | |
| CCQUZG-3-OT | 9.80% | | |

Example M8

| | | | |
|---|---|---|---|
| BCH-3F.F | 10.80% | Clearing point [° C.]: | +90.9 |
| BCH-5F.F | 9.00% | Δn [589 nm, 20° C.]: | +0.0976 |
| ECCP-30CF₃ | 4.50% | Δε [1 kHz, 20° C.]: | +7.0 |
| ECCP-50CF₃ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF₃ | 7.20% | | |
| CCP-30CF₃ | 10.80% | | |
| CCP-40CF₃ | 6.30% | | |
| CCP-50CF₃ | 9.90% | | |
| PCH-5F | 9.00% | | |
| CQUZG-3-OT | 10.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds, which comprises one or more compounds of the formula I

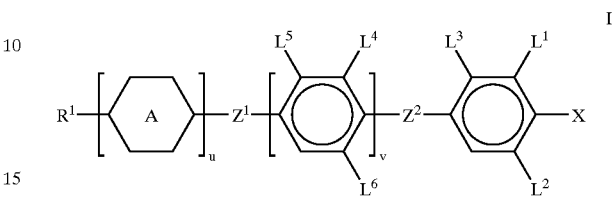

in which $R^1$ is an alkyl radical having from 1 to 12 carbon atoms which is unsubstituted, monosubstituted by CN or $CF_3$ or monosubstituted to perhalo-substituted by halogen, where one or more $CH_2$ groups in these radicals, in each case independently of one another, are optionally replaced by —O—, —S—,

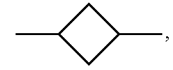

—CH=CH—, —C≡C—, —CO—, —CO—O—, —O—CO— or —O—CO—O— in such a way that O atoms are not linked directly to one another,

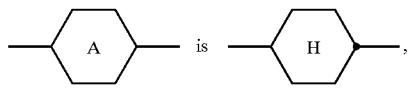

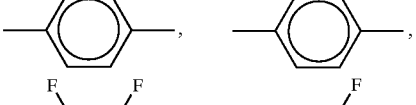

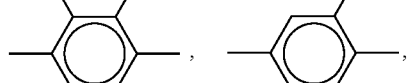

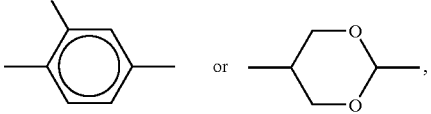

$L^{1-6}$ are each, independently of one another, H or F, $Z^1$ is —$CF_2O$— and $Z^2$ is —COO—, X is F, Cl, CN, OCN, NCS, SCN, $SF_5$, an unsubstituted alkyl or alkoxy radical, a halogenated alkyl radical, a halogenated alkenyl radical, a halogenated alkoxy radical or a halogenated alkenyloxy radical having up to 6 carbon atoms and up to perhalo substitution, u is 1 or 2, and v is 1 or 2, provided that: when $R^1$ is alkyl, u is 1, v is 1 and X is F, CN, an alkyl radical, halogenated alkyl radical or a halogenated alkoxy radical; the A ring is not phenyl or fluorinated phenyl.

2. A medium according to claim 1, which additionally comprises one or more compounds selected from the group consisting of compounds of the formulae II, III, IV, V, VI, VII and VIII:

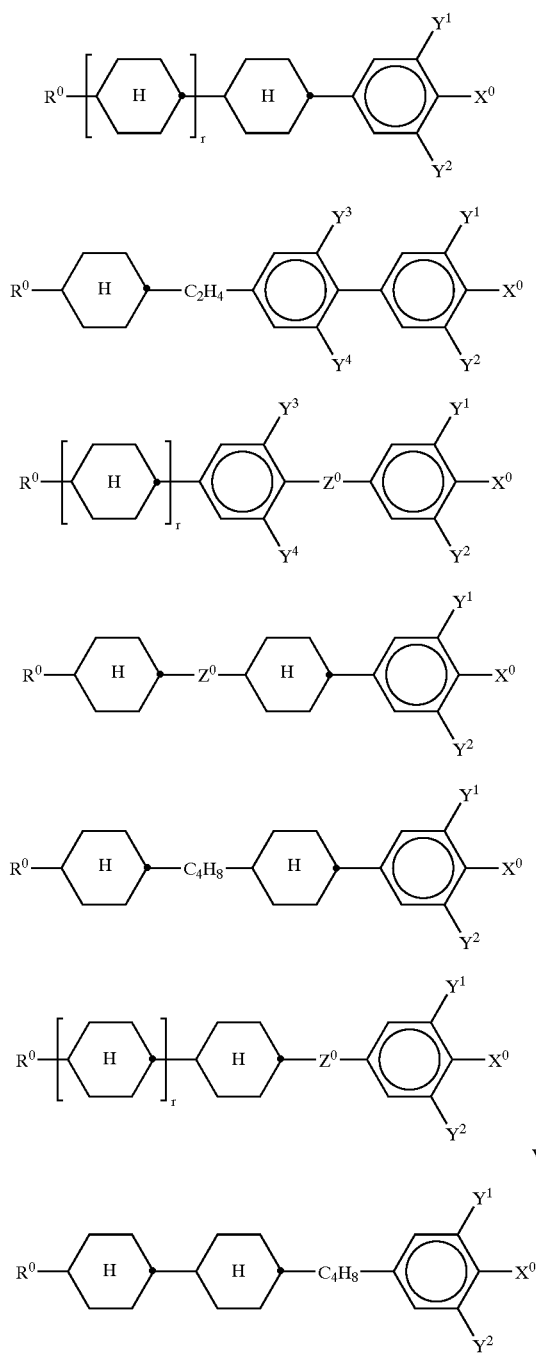

in which the individual radicals have the following meanings:

$R^0$: n-alkyl, alkoxy, oxaalkyl, fluoroalkyl or alkenyl, each having up to 9 carbon atoms, $X^0$: F, Cl, halogenated alkyl, halogenated alkenyl, halogenated alkenyloxy or halogenated alkoxy having from 1 to 6 carbon atoms, $Z^0$: —$C_2H_4$—, —CH=CH—, —$CH_2O$—, —$OCH_2$—, —COO—, —$OCF_2$—, —$CF_2O$—, —CF=CF—, —$C_2F_4$—, —$CH_2CF_2$— or —$CF_2CH_2$—, $Y^1, Y^2, Y^3, Y^4$: each, independently of one another, H or F, and r: 0 or 1.

3. A medium according to claim 2, wherein the proportion of compounds of the formulae I to VII together in the mixture as a whole is at least 30% by weight.

4. A medium according to claim 1, wherein the proportion of compounds of the formula I in the mixture as a whole is from 1 to 50% by weight.

5. A medium according to claim 2, wherein the proportion of compounds of the formula I in the mixture as a whole is from 1 to 50% by weight.

6. A medium according to claim 2, wherein the proportion of compounds of the formulae II to VIII in the mixture as a whole is from 20 to 80% by weight.

7. A medium according to claim 1, which further comprises one or more compounds of the formula IVa

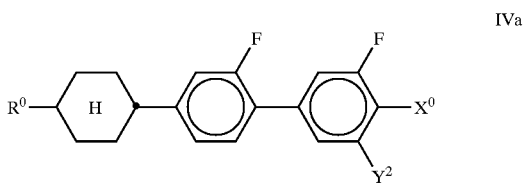

in which the individual radicals have the following meanings:

$R^0$: n-alkyl, alkoxy, oxaalkyl, fluoroalkyl or alkenyl, each having up to 9 carbon atoms, $X^0$: F, Cl, halogenated alkyl, halogenated alkenyl, halogenated alkenyloxy or halogenated alkoxy having from 1 to 6 carbon atoms, and $Y^2$: is H or F.

8. A medium according to claim 2, which further comprises one or more compounds of the formula IVa

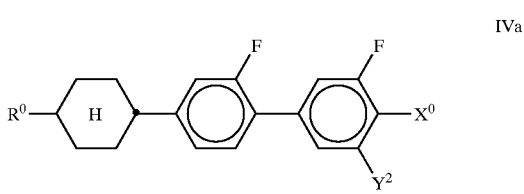

in which the individual radicals have the following meanings:

$R^0$: n-alkyl, alkoxy, oxaalkyl, fluoroalkyl or alkenyl, each having up to 9 carbon atoms, $X^0$: F, Cl, halogenated alkyl, halogenated alkenyl, halogenated alkenyloxy or halogenated alkoxy having from 1 to 6 carbon atoms, and $Y^2$: is H or F.

9. A medium according to claim 2, comprising a compound of one of formulae II–VIII wherein $X^0$ is F, $OCHF_2$ or $OCF_3$, and $Y^2$ is H or F.

10. A medium according to claim 7, comprising a compound of formula IVa wherein $X^0$ is F, $OCHF_2$ or $OCF_3$, and $Y^2$ is H or F.

11. A medium according to claim 1, which comprises a compound of the formula I wherein $R^1$ is straight-chain alkyl.

12. A liquid-crystalline compound of the formula I:

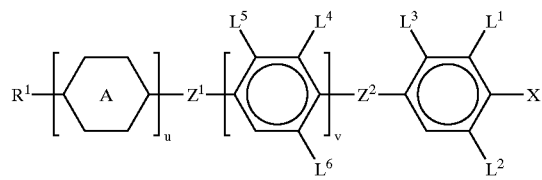

in which

R¹ is an alkyl radical having from 1 to 12 carbon atoms which is unsubstituted, monosubstituted by CN or $CF_3$ or monosubstituted to perhalo-substituted by halogen, where one or more $CH_2$ groups in these radicals, in each case independently of one another, are optionally replaced by —O—, —S—,

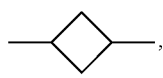

—CH=CH—, —C≡C—, —CO—, —CO—O—, —O—CO— or —O—CO—O— in such a way that O atoms are not linked directly to one another,

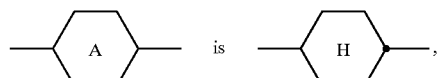

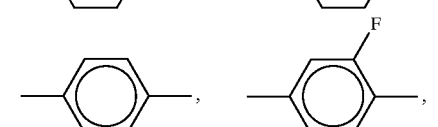

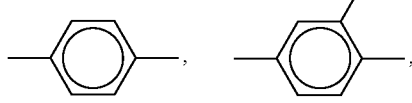

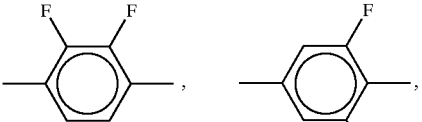

$L^{1-6}$ are each, independently of one another, H or F, $Z^1$ is —$CF_2O$— and $Z^2$ is —COO—, X is F, Cl, CN, OCN, NCS, SCN, $SF_5$, an unsubstituted alkyl or alkoxy radical, a halogenated alkyl radical, a halogenated alkenyl radical, a halogenated alkoxy radical or a halogenated alkenyloxy radical having up to 6 carbon atoms and up to perhalo halogenation, u is 1 or 2, and v is 1 or 2, provided that: when R¹ is alkyl, u is 1, v is 1 and X is F, CN, an alkyl radical, halogenated alkyl radical or a halogenated alkoxy radical; the A ring is not phenyl or fluorinated phenyl.

13. A liquid-crystalline compound of one of the formulae I1 to I32

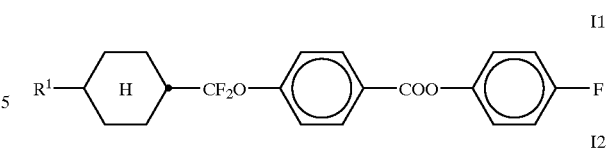
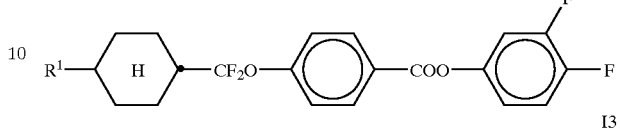
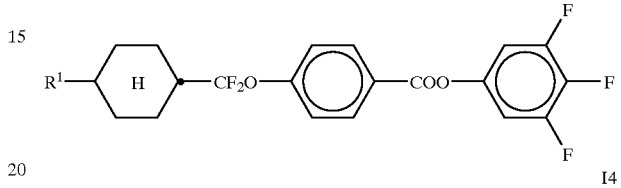
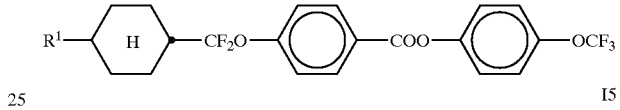
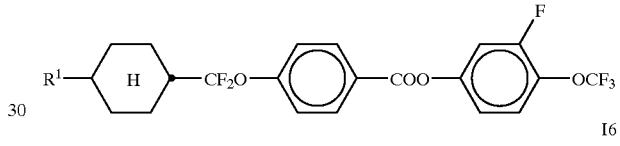
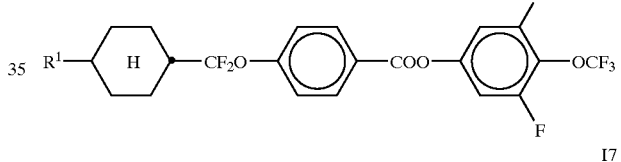
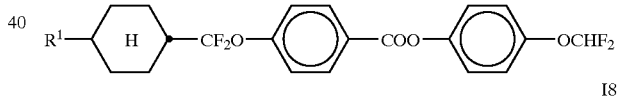
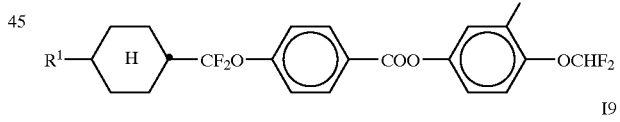
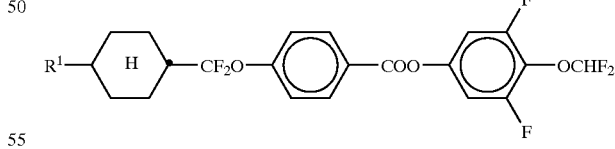
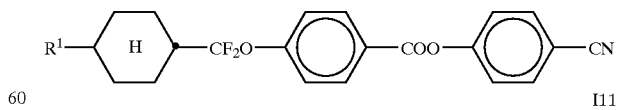
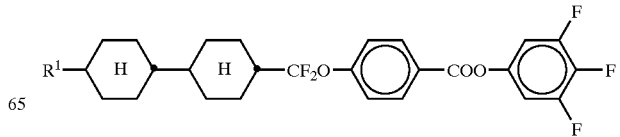

I12
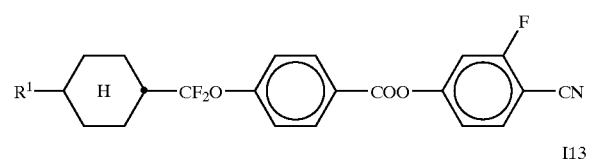
I13
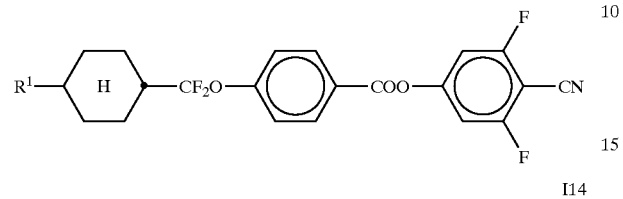
I14
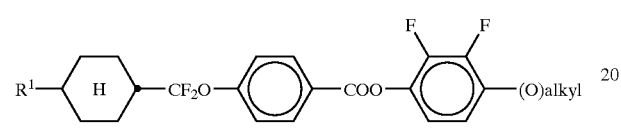
I15
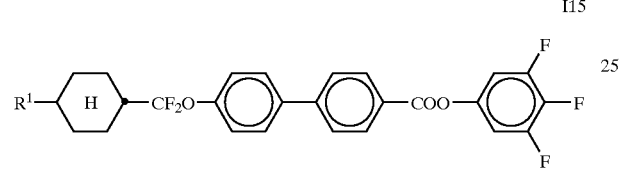
I16
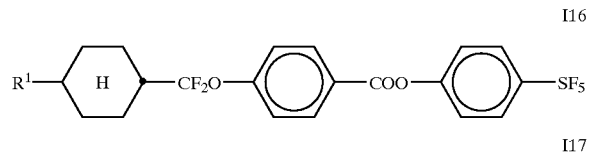
I17
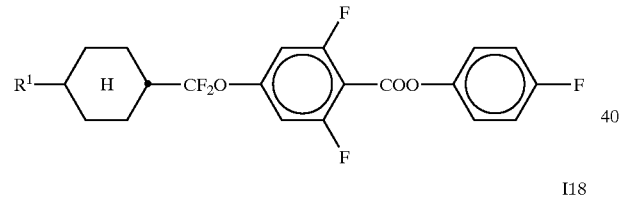
I18
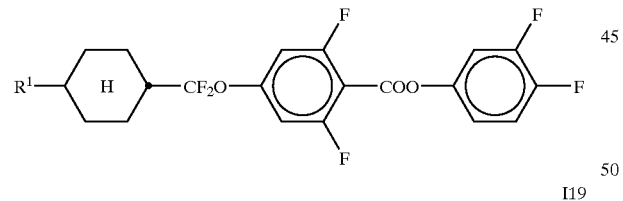
I19
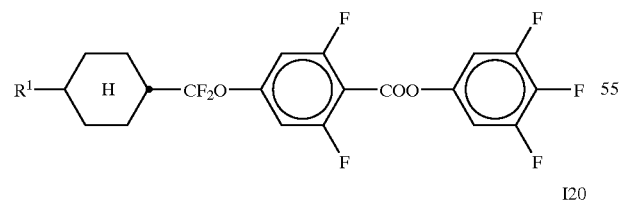
I20
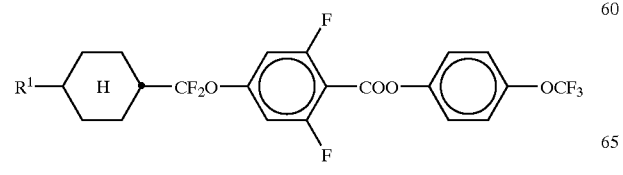
I21
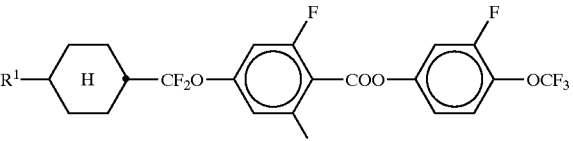
I22
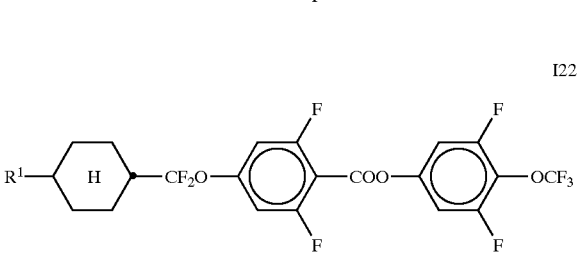
I23
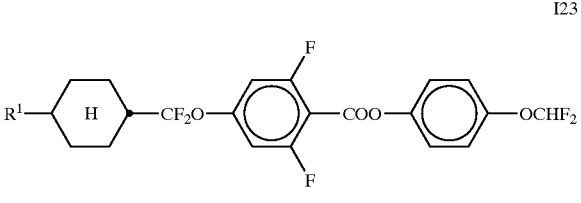
I24
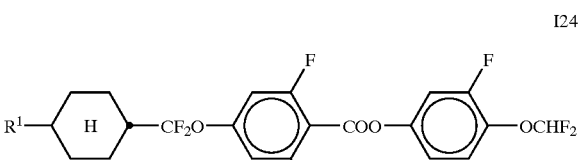
I25
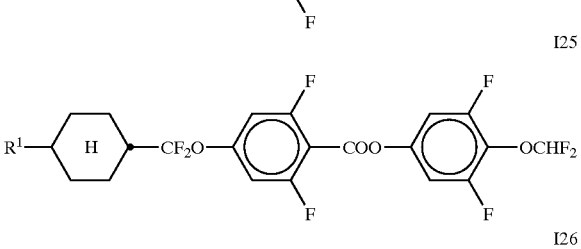
I26
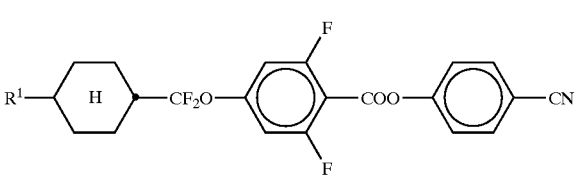
I27
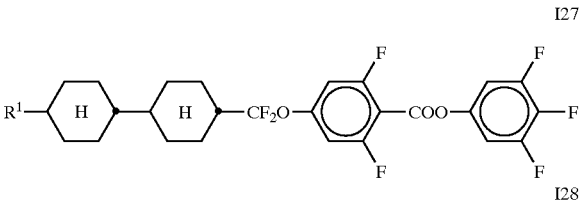
I28
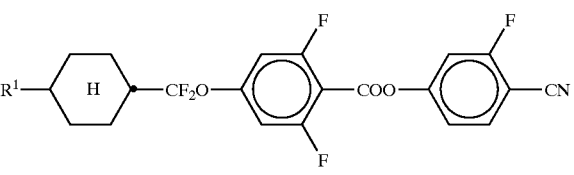

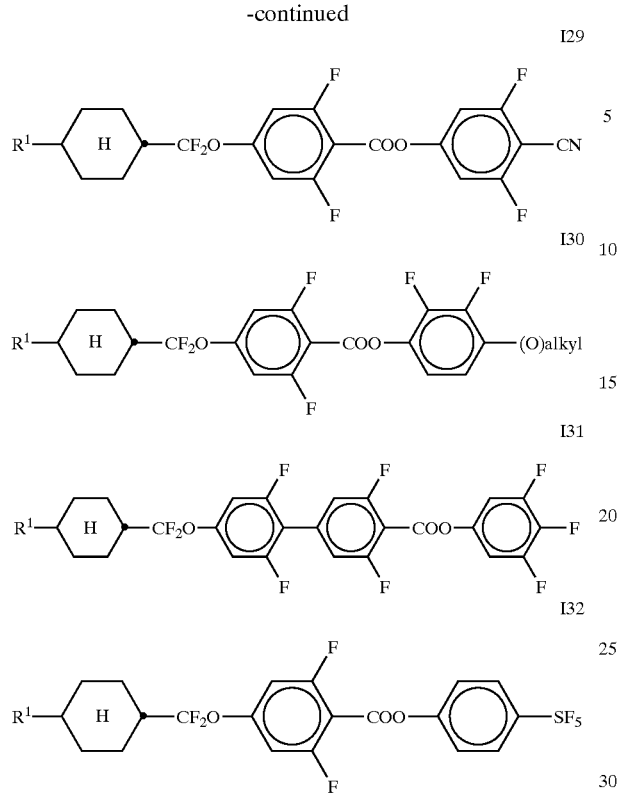

in which

R[1] is an alkyl radical having from 1 to 12 carbon atoms which is unsubstituted, monosubstituted by CN or CF$_3$ or monosubstituted to perhalo-substituted by halogen, where one or more CH$_2$ groups in these radicals, in each case independently of one another, are optionally replaced by —O—, —S—,

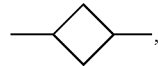

—CH═CH—, —C≡C—, —CO—, —CO—O—, —O—CO— or —O—CO—O— in such a way that O atoms are not linked directly to one another, and (O)alkyl is a straight-chain or branched alkyl or alkoxy group having 1–7 carbon atoms.

14. An electro-optical liquid-crystal display containing a liquid-crystalline medium according to claim 1.

15. A display of claim 14, which is an MLC, TN or STN display.

16. A medium according to claim 1, which has a TN threshold below 2.0V.

17. A medium according to claim 1, which has a rotational viscosity at 20° C. of <180 mPa·s.

18. A medium according to claim 2, which consists essentially of compounds of the formulae I to VIII.

* * * * *

UNITED STATES PATENT AND TRADEMARK OFFICE
CERTIFICATE OF CORRECTION

PATENT NO. : 6,908,645 B2
DATED : June 21, 2005
INVENTOR(S) : Michael Heckmeier

It is certified that error appears in the above-identified patent and that said Letters Patent is hereby corrected as shown below:

Column 76,
Line 1, after "$Y^3$," insert -- $Y^3$ and --.
Line 5, delete "VII" and insert -- VIII --.

Signed and Sealed this

Twentieth Day of September, 2005

JON W. DUDAS
*Director of the United States Patent and Trademark Office*